(12) United States Patent
Lahtinen et al.

(10) Patent No.: US 10,920,048 B2
(45) Date of Patent: *Feb. 16, 2021

(54) TYRE COMPRISING HYDROTHERMALLY CARBONIZED LIGNIN

(71) Applicant: Nokian Renkaat Oyj, Nokia (FI)

(72) Inventors: Mika Lahtinen, Tampere (FI); Anne Ojala, Nokia (FI); Harri Myllymaa, Nokia (FI); Harri Moisio, Pirkkala (FI); Noora Kemppainen, Lempäälä (FI)

(73) Assignee: Nokian Renkaat Oyj, Nokia (FI)

( * ) Notice: Subject to any disclaimer, the term of this patent is extended or adjusted under 35 U.S.C. 154(b) by 83 days.

This patent is subject to a terminal disclaimer.

(21) Appl. No.: 16/412,681

(22) Filed: May 15, 2019

(65) Prior Publication Data

US 2019/0284375 A1 Sep. 19, 2019

Related U.S. Application Data

(63) Continuation-in-part of application No. 15/771,497, filed as application No. PCT/EP2017/060363 on May 2, 2017, now Pat. No. 10,428,218.

(30) Foreign Application Priority Data

May 9, 2016 (EP) ..................................... 16397514

(51) Int. Cl.
| | |
|---|---|
| *C08L 21/00* | (2006.01) |
| *C08L 97/00* | (2006.01) |
| *C08K 3/04* | (2006.01) |
| *C08K 5/13* | (2006.01) |
| *C08K 5/548* | (2006.01) |
| *C08K 5/3492* | (2006.01) |
| *B60C 1/00* | (2006.01) |

(52) U.S. Cl.
CPC ................ *C08L 21/00* (2013.01); *C08K 3/04* (2013.01); *C08K 5/13* (2013.01); *C08K 5/34922* (2013.01); *C08K 5/548* (2013.01); *C08L 97/005* (2013.01); *B60C 1/0016* (2013.01); *B60C 1/0025* (2013.01); *B60C 2001/005* (2013.01)

(58) Field of Classification Search
CPC . C08H 6/00; C08K 3/04; C08K 5/548; C08K 3/36; C08K 5/34922; C08K 5/13; C08K 2201/006; C08L 9/06; C08L 7/00; C08L 97/005; C08L 9/00; C08L 21/00; B60C 1/0025; B60C 2001/005; B60C 1/0016
See application file for complete search history.

(56) References Cited

U.S. PATENT DOCUMENTS

| | | |
|---|---|---|
| 2007/0193669 A1 | 8/2007 | Giannini et al. |
| 2012/0302664 A1 | 11/2012 | Kamada |
| 2016/0230099 A1* | 8/2016 | Hilli ....................... C01B 32/336 |

OTHER PUBLICATIONS

Notice of Allowance of RU2017142626 issued by Russian Patent Office dated Jan. 16, 2020 (4 pages).

* cited by examiner

*Primary Examiner* — Angela C Scott
(74) *Attorney, Agent, or Firm* — Berggren LLP

(57) ABSTRACT

The invention relates to a method for manufacturing a tyre, wherein the tyre comprises a metal component, a textile component and a cured rubber based component bonded together by means of curing, and wherein the cured rubber based component comprises lignin that has been treated by hydrothermal carbonization. The invention further relates to use of lignin that has been treated by hydrothermal carbonization in a rubber based component of a pneumatic tyre.

23 Claims, 14 Drawing Sheets

TYRE COMPRISING HYDROTHERMALLY CARBONIZED LIGNIN

PRIORITY

This is a continuation-in-part application of the U.S. patent application Ser. No. 15/771,497 filed on Apr. 27, 2018 and being national application of the international application number PCT/EP2017/060363 filed on May 2, 2017 and claiming priority of EP application number 16397514.7 filed on May 9, 2016, the contents of all of which are incorporated herein by reference.

FIELD OF THE INVENTION

The invention relates to a pneumatic tyre for a vehicle, the pneumatic tyre comprising a rubber based component comprising lignin that has been treated by hydrothermal carbonization, to a method for manufacturing such a tyre and to use of lignin that has been treated by hydrothermal carbonization in a pneumatic tyre for a vehicle.

BACKGROUND

A pneumatic tyre may be used in various types of vehicles and automobiles. A pneumatic tyre, once mounted on a rim and inflated, is capable to absorb shocks when moving over uneven road. An inflated pneumatic tyre mounted under a vehicle thus serves as an inflatable cushioning for a vehicle.

Approximately close to a billion pneumatic tyres are manufactured annually in the world. A pneumatic tyre typically comprises a variety of different materials, such as rubber based components. Rubber based components typically join various tyre materials together, when the tyre is cured during the tyre manufacturing process. A rubber based component of a pneumatic tyre typically comprises natural rubber and/or synthetic rubber. The rubber is typically mixed with carbon black in order to obtain rubber having higher reinforcement characteristics.

Each tyre component can be designed for a dedicated purpose. For example, tread area components of a pneumatic tyre, which typically are in contact with the road, may require different characteristics than non-tread area components of the tyre. The composition of the rubber based component therefore plays a role in the viscoelastic and mechanical performance of the tyre. The amount and type of materials used in the composition of the rubber based component may have an effect e.g. on traction, tread wear and rolling resistance of the tyre.

Rolling resistance refers to deformation of the tyre, when the tyre is rotating and is in contact with the road surface. The resistance is to a large extent due to the viscoelastic behavior of the tyre. Rolling resistance accounts for a considerable proportion of fuel consumption in fuel-driven vehicles. Rolling resistance also plays a role in the energy consumption of other types of vehicles, such as those using hybrid technologies or electricity. Traction and tread wear are performance parameters which also affect the behavior and durability of the tyre. While traction is typically desirable, the tread wear and rolling resistance of the tyre are not desirable. The tyre performance optimization thus form a challenge, since the optimization of one parameter often may lead to negative results in other desired characteristics.

Tyre characteristics such as durability, reinforcing effect or viscoelastic behavior, are related to the proportion of filler materials in the rubber based components, such as carbon black. A pneumatic tyre may comprise high amounts of carbon black as reinforcing filler material, such as up to 40 wt. % or more. One of the most common uses of carbon black nowadays is as a pigment and reinforcing filler material in automobile tyres. Carbon black consists mostly of elemental carbon. Carbon black is typically manufactured from fossil carbon sources. Rubber-grade carbon black is typically manufactured in specific grades, each grade having defined characteristics, such as size distribution and specific surface area according to ASTM standard D1765-14. The final characteristics of a tyre are determined from a cured tyre. Curing is typically done by vulcanization means.

Rolling resistance may be reduced by adding inorganic filler material, such as silica, into the rubber based components located on the tread area of the tyre. Silica ($SiO_2$) is a chemical compound, which exists in various grades and forms, for example as precipitated silica.

Conventional filler materials such as carbon black and silica, when used as such, are relatively inert. Carbon black interacts in the rubber based component mainly by means of physical interactions. Silica on the other hand, only interacts once bound into the tyre component by means of a silane based coupling agent.

Conventional tyre materials pose many challenges. Tyre manufacturing industry is a major consumer of materials used in rubber based components. A pneumatic tyre may comprise equal to or more than 80 wt. % of rubber based components, when calculated of the total weight of the tyre. The extensive use of material originating from fossil carbon sources in a tyre is a problem. The complex material composition of traditional tyres makes them difficult to recycle. The tyre rubber manufacturing process may involve the use of hazardous material, for example to increase stiffness of the rubber component. Silica is relatively expensive. Despite of the use of silica, the conventional filler materials still cause considerable amounts of heat generation and flexing fatigue of a tyre, when the tyre is used, which is undesirable.

Rapidly emerging environmental aspects, such as fuel consumption and noise level reduction efforts in the automobile industry, set new requirements also to tyre manufacturers. The renewability requirements and environmental aspects of a tyre play an increasingly important role in the selection of tyre raw materials. There is a need to produce tyres having improved performance characteristics and better environmental sustainability.

SUMMARY

Some versions relate to a pneumatic tyre for a vehicle, wherein the pneumatic tyre comprises lignin that has been treated by hydrothermal carbonization. Some versions relate to a method for manufacturing a pneumatic tyre for a vehicle, wherein the pneumatic tyre comprises lignin that has been treated by hydrothermal carbonization. Some versions relate to use of lignin that has been treated by hydrothermal carbonization in a pneumatic tyre for a vehicle.

Lignin is renewable and environmentally sustainable raw material, which may be converted into material suitable for pneumatic tyres. Lignin containing material is easily available for industrial purposes in large quantities. Lignin is a major by-product of the pulp and paper industry. Paper is manufactured from softwood and hardwood, which contain significant amounts of lignin. A typical example of lignin containing material is spent liquor from biomass fractionation, such as pulp mill black liquor. Agricultural crop residue is another example of lignin containing material.

Lignin in general contains relatively high amounts of functional groups. Lignin contains functional groups, which may participate in chemical reactions and form chemical bonds. Functional groups typically present in lignin comprise, for example, carbonyl groups, aliphatic hydroxyl groups and phenolic hydroxyl groups. Functional groups of lignin are detectable even after a chemical pulping process, in black liquor. The further processing of lignin containing material, particularly of lignin originating from wood, therefore is environmental and cost-effective way of providing lignin derivatives with functional properties, which may be used as a source of renewable raw material for a pneumatic tyre.

A hydrothermal carbonization treatment of lignin refers to a thermochemical conversion process of lignin containing material in an aqueous suspension. Hydrothermal carbonization treatment of lignin produces lignin derivatives having high carbon content and functional groups. Lignin that has been treated by hydrothermal carbonization, hereafter denoted as HTC lignin, provides a cost-effective means for improving tyre performance. Lignin that has been treated by hydrothermal carbonization may comprise lignin of wooden origin. HTC lignin originating from softwood such as spruce or pine has been found to contain a particularly suitable molecular structure, which can improve the characteristics of rubber based components of a pneumatic tyre. HTC lignin in a rubber based component of a pneumatic tyre can improve the environmental sustainability of the pneumatic tyre.

HTC lignin may be mixed with rubber compounds typically used in the tyre industry, such as natural rubber, polybutadiene rubber, styrene-butadiene rubber and/or polyisoprene rubber, to manufacture a rubber composition. HTC lignin contains surface active functional groups. HTC lignin may be configured to form chemical bonds with other compounds present in the rubber composition. A rubber based component comprising HTC lignin may thus be configured to comprise specific characteristics. HTC lignin may used to select the characteristics of a rubber composition, such that a tyre component with improved performance may be manufactured. HTC lignin may thus be arranged to improve the performance of a pneumatic tyre.

HTC lignin may be arranged to comprise, for example, carbon content, surface chemistry, particle size, particle size distribution and/or morphology of the particle, which are suitable for a rubber based component of a pneumatic tyre.

Hydrothermal carbonization treatment of lignin has the effect of fragmenting the lignin molecular structure. In general, the specific surface area of HTC lignin may be in the range of 10-150 $m^2/g$, when measured according to ASTM D-6556-10 after the hydrothermal carbonization treatment from material which has not been mixed with rubber, referred to as virgin material. In general, the oil absorption number of HTC lignin may be in the range of 60-130 ml/100 g, when measured according to ASTM D2414-09 after the hydrothermal carbonization treatment from material which has not been mixed with rubber, referred to as virgin material.

Hydrothermal carbonization treatment of lignin has the effect of increasing the carbon content of lignin containing material. HTC lignin has a high carbon content, typically 40 wt. % or more, such as in the range of 40 to 65 wt. %, or even higher.

Hydrothermal carbonization treatment of lignin may be arranged to preserve functional groups of lignin. HTC lignin may thus comprise functional groups which are capable of bonding in a chemical reaction with other compounds present in a rubber composition of a pneumatic tyre, as disclosed above. HTC lignin has capability to both physical interactions and chemical bonding in a rubber based component of a pneumatic tyre. HTC lignin may be arranged to have a molecular structure suitable for both physical and chemical interactions within a rubber based component of a pneumatic tyre. HTC lignin which has capability to both physical interactions and chemical bonding may be used to improve performance characteristics of a pneumatic tyre.

Hydrothermal carbonization treatment of lignin has the effect of producing lignin derivatives with distinguishable characteristics. The molecular structure of HTC lignin differs from conventional materials used in rubber based components of a tyre, such as carbon black or silica. Hydrothermal carbonization treatment of lignin may be arranged to produce HTC lignin containing carbolic acid functionality, such as 2-methoxyphenolic functionality. HTC lignin containing 2-methoxyphenolic functionality may in particular be produced from lignin of softwood origin. Analytical methods may be used to determine the presence of lignin derivatives in a cured rubber component of a pneumatic tyre. Analytical method suitable for determination of presence of a lignin derivative in a cured rubber component of a pneumatic tyre are, for example, Pyrolysis-Gas Chromatography/Mass Spectroscopy (GC/MS) analysis, Pyrolysis-Fourier transform infrared spectroscopy (pyro-FTIR) analysis, thermogravimetric analysis or a combination of these, to name a few. For example, a cured rubber based component of a pneumatic tyre that contains HTC lignin may be pyrolyzed, thereby producing material referred to as a pyrolysis product. Suitable pyrolysis temperature may be about 550° C., when performed according to standard ASTM D3452-06. Pyrolysis-Gas Chromatography/Mass Spectroscopy analysis may be used as a means to determine the presence of a distinct compound or derivative in the HTC lignin, such as 2-methoxyphenol. The pyrolysis product may be further analyzed by means of Pyrolysis-Fourier transform infrared spectroscopy, the method detecting absorption peak ranges and intensity levels specific to HTC lignin comprising functional groups.

HTC lignin suitable for a rubber based component of a pneumatic tyre acts differently in specific surface area analysis, when compared to a cured rubber based component comprising only silica and/or carbon black, when determined by multipoint nitrogen adsorption according to ASTM D6556-10. When pyrolysed at 600° C., a cured rubber based component comprising HTC lignin produces a pyrolysis product having a higher surface area than cured rubber based component comprising only silica and/or carbon black, which would typically be used for the same purpose in a pneumatic tyre.

Tangent delta value denotes a ratio of loss to storage modulus, which is commonly used to describe the rolling resistance of a tyre. Experimental test results demonstrate that HTC lignin may be used to reduce the heat generation and flexing fatigue of a pneumatic tyre. A cured rubber based component of a pneumatic tyre comprising HTC lignin may have a lower tangent delta value than a cured rubber based component comprising either carbon black or silica. HTC lignin may be used to reduce the heat generation and flexing fatigue of a pneumatic tyre with or without a silane based coupling agent. A rubber based component of a pneumatic tyre containing HTC lignin with 2-methoxyphenolic functionality has been observed to be particularly suitable for reducing the tangent delta, heat generation and/or flexing fatigue of the pneumatic tyre.

The elasticity of a cured rubber based compound is commonly analyzed by means of a 300% modulus test. The 300% modulus test refers to a method for determining the stress in megapascals (Mpa) required to produce a 300% elongation of a sample in a uniaxial tension test. Experimental test results demonstrate that a cured rubber based component comprising HTC lignin may be used to improve the reinforcing capability of a pneumatic tyre. A cured rubber based component of a pneumatic tyre comprising HTC lignin may have a higher modulus value (300% modulus test) than cured rubber based component comprising carbon black. A cured rubber based component of a pneumatic tyre comprising HTC lignin has a significantly higher modulus value (300% modulus) than a cured rubber based component comprising lignin which has not been treated by hydrothermal carbonization. Such lignin refers to e.g. lignin present in a pulp mill black liquor.

HTC lignin is ecologically sustainable raw material. HTC lignin may be used as renewable raw material in a rubber based component of a pneumatic tyre. HTC lignin may act as a reinforcing agent in a rubber based composition of a pneumatic tyre. HTC lignin may be used to reduce or replace the amount of conventional carbon black in a pneumatic tyre. HTC lignin may be used to reduce or replace silica in a pneumatic tyre. A rubber based component comprising HTC lignin thus provides means to reduce the content of fossile carbon based materials in a pneumatic tyre.

A rubber based component comprising HTC lignin is capable to improve the characteristics and performance of the pneumatic tyre. A rubber based component comprising HTC lignin suitable for reducing the rolling resistance of a pneumatic tyre. A rubber based component comprising HTC lignin is particularly suitable for reducing the rolling resistance of a pneumatic tyre, when the rubber based component comprises HTC lignin in amounts equal to or higher than 10% by weight of the rubber based component. The rubber based component may be a tread area component or a non-tread area component of the pneumatic tyre. A non-tread area component refers to e.g. a sidewall area component or a bead area component of a pneumatic tyre.

A rubber based component of a pneumatic tyre may comprise HTC lignin bonded to a rubber compound by means of chemical bonds as well as by means of physical interactions. A rubber based component of a pneumatic tyre may comprise HTC lignin which has been reacted with a methylene donor compound. When HTC lignin is used together with a methylene donor compound in a rubber based component of a pneumatic tyre, the combination acts as a hardening agent capable of forming network structures. A combination of HTC lignin and methylene donor may be used to increase the stiffness of a cured rubber based component of a pneumatic tyre. Such combination may be used to replace phenolic resins. Phenolic resins typically used in rubber compounds provide methylene bridge linkages, when interacting with a methylene donor compound. Phenolic resins typically used in rubber compounds are hazardous material. A rubber based component comprising HTC lignin thus provides means to reduce the content of phenolic resins in a tyre.

According to a first aspect, there is provided a pneumatic tyre for a vehicle, the tyre comprising a metal component, a textile component and a cured rubber based component, wherein the components have been bonded together by means of curing and the cured rubber based component comprises lignin that has been treated by hydrothermal carbonization.

According to a second aspect, there is provided a method for manufacturing a pneumatic tyre for a vehicle, the method comprising
receiving a rubber based component comprising lignin that has been treated by hydrothermal carbonization,
arranging the rubber based component onto a building drum to form a tubular preform,
expanding the tubular preform to form a preform of a pneumatic tyre,
arranging a metal component and a textile component onto the preform of a tyre, thereby manufacturing a preform of a pneumatic tyre comprising the rubber based component comprising lignin that has been treated by hydrothermal carbonization, the metal component and the textile component, and
curing the preform of a pneumatic tyre, thereby bonding the components together by means of curing and thereby manufacturing the pneumatic tyre for a vehicle, the tyre thereby comprising a cured rubber based component.

According to a third aspect, there are provided various uses of lignin that has been treated by hydrothermal carbonization to improve the performance of a pneumatic tyre.

According to a fourth aspect, there are provided various uses of a cured rubber based component comprising lignin that has been treated by hydrothermal carbonization to improve the performance of a pneumatic tyre.

The invention is further presented in the detailed description of the invention and in the independent and dependent claims.

DETAILED DESCRIPTION

A Pneumatic Tyre

A pneumatic tyre in this context refers to a radial tyre used on a motor driven vehicle. Typical examples of pneumatic tyres are passenger car, SUV-, VAN-, bus and/or truck tyres. Pneumatic tyres, referred to as heavy tyres, may also be used in mining, harbour and forestry applications.

A method for manufacturing a pneumatic tyre for a vehicle typically comprises manufacturing a preform of a pneumatic tyre, which is then cured. The manufacturing of a preform of a pneumatic tyre may comprise receiving a rubber based component and arranging the rubber based component onto a building drum to form a tubular preform. When the tubular preform is expanded, a preform of a pneumatic tyre is obtained. Typically, metal components and textile components are arranged onto the preform of a tyre.

Thus, a preform of a pneumatic tyre may comprise a metal component, a textile component and the rubber based component. The method further typically comprises curing of the preform of a pneumatic tyre. Curing may be a vulcanization process, wherein the preform is heated in a temperature typically less than 200° C., such as in the range of 150 to 200° C. During the curing reaction, sulphur containing compounds present in the rubber based components undergo cross-linking reactions. The formed cross-linked structure bonds the tyre components firmly together. The duration of the curing may vary. Passenger car tyres are typically cured from few minutes up to half an hour, such as in the range of 5 to 30 minutes. Heavy tyres may be cured for several hours.

Figure 1:
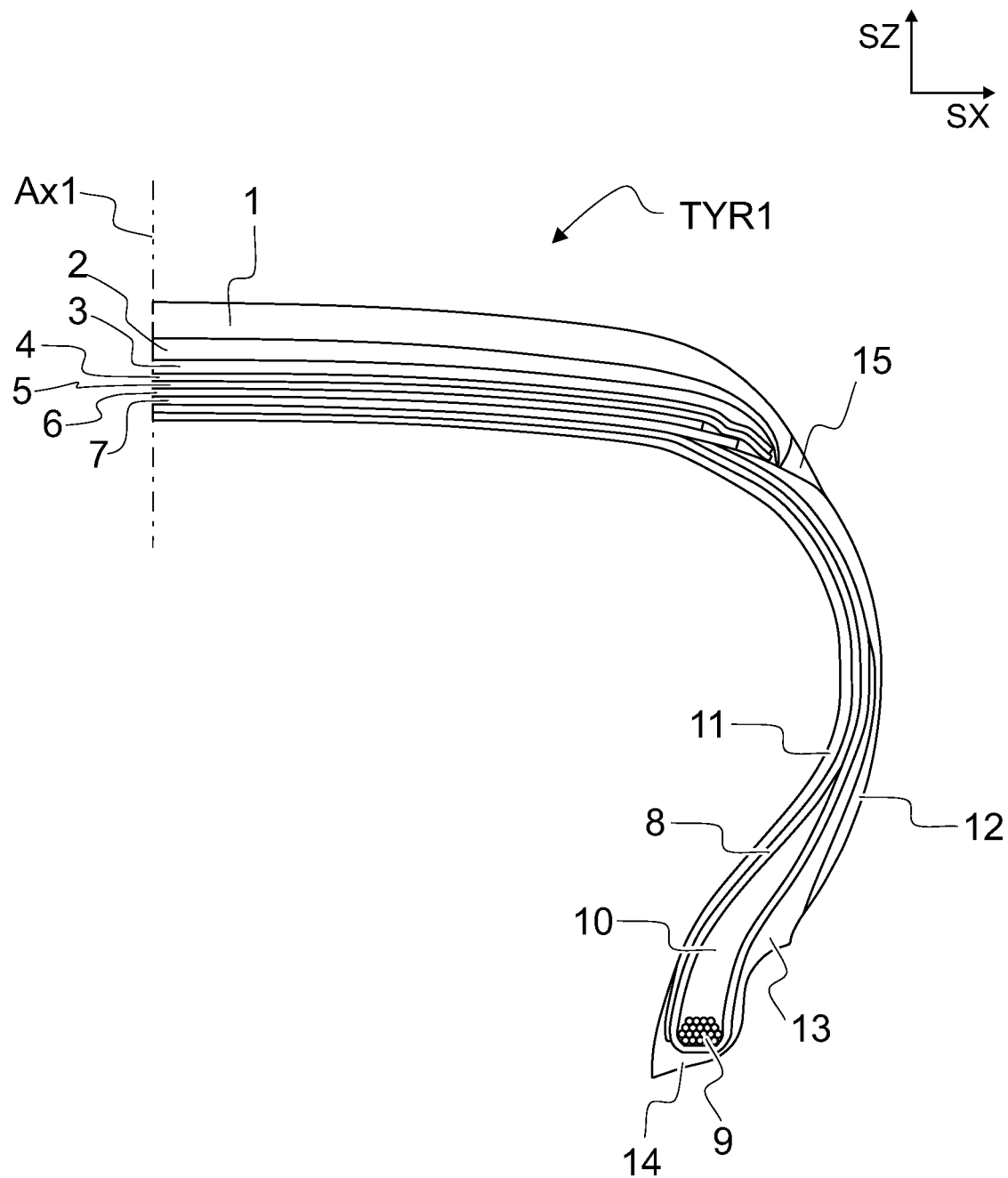
FIG. 1 illustrates, by way of an example, a pneumatic tyre for a vehicle.

Referring to FIG. 1. FIG. 1 is a sectional view of a pneumatic tyre TYR1 up to a centerline Ax1. The centerline Ax1 divides the section width of the tyre TYR1 into two halves of equal width. The directions SX and SZ denote orthogonal directions. SX is a direction parallel to the section width and perpendicular to the plane of rotation of the tyre TYR1. SZ is a direction parallel to the centerline Ax1.

A pneumatic tyre TYR1 for a vehicle is typically manufactured of multiple components 1-15 and comprises a variety of materials, such as metal, textile and multiple types of rubber based components. In general, a pneumatic tyre TYR1 may comprise one or more layers of reinforcing textile, such as polyester or nylon for radial ply 8, as well as nylon belts 4, 5. The pneumatic tyre TYR1 may comprise one or more metal components for reinforcement purposes, such as resilient steel belts 6, 7 and bead wire 9.

The metal component and the textile component are bonded to the tyre elastically by means of one or more rubber based components, when the tyre is cured. Due to the high complexity of a pneumatic tyre and different materials used, the composition of each rubber based component used at various locations in the tyre may have a significant effect on the performance of the tyre. Each rubber based component used in a tyre may be arranged to provide a specific characteristic on the tyre. The rubber based components of a pneumatic tyre TYR1 may be divided into tread area components and non-tread area components.

The exterior of the tyre is called a tyre carcass, referring to a thick profile surrounding the tyre. The tread area components in the tyre carcass provide an interface between the tyre and the road. The tread area components are thus components designed to be in contact with the road. The area of the tyre that is designed to contact the road surface may also be denoted as the crown. The tread area components are configured to comprise wear resistance and traction. Hard tread area components may provide less wear and reduce the rolling resistance of the tyre. Soft tread area components may provide better traction. The rubber based components of the tread area may comprise components such as tread 1, tread base 2, undertread 3 and shoulder 15. A tread pattern refers to a tread surface configured to comprise surface deviation, such as ribs, blocks, grooves and/or sipes, which may have an effect on noise, handling, traction or wear of the tyre TYR1. The tread 1 may comprise additional structural elements, such as metal studs. The shoulder 15 refers to the area on both sides of the tread area, which extends from the tread and ends at tread skirt. Tread skirt defines the intersection of tread area and sidewall area. The shoulder 15 may sometimes be referred to as shoulder wedge or tread wing.

The non-tread area components refer to component on the sidewall and bead areas of the tyre TYR1. The sidewall area components of a pneumatic tyre TYR1 refers to components between the tread and the bead areas and comprise, for example, sidewall 12. The sidewall is typically configured to withstand flexing and provide protection for the ply 8. The bead area components of a pneumatic tyre TYR1 may comprise, for example, clinch 13, apex 10 and bead base 14. The clinch 13 and apex 10 may overlap both on the sidewall and bead areas, and thus belong to both sidewall and bead area components. Apex 10 is configured to fill in the bead area and lower sidewall area. Apex 10 has the effect of providing a smoother transition from the stiff bead area to the more flexible sidewall area. Clinch 13 is configured to be a reinforcing component between bead and lower sidewall. Clinch 13 acts as a stabilizing component. Clinch 13 has the effect of resisting rim chafing. Clinch 13 provides a smoother transition from the stiff bead area to the more flexible sidewall area. Clinch 13 enables a proper seating of the bead base 14 to a rim flange, thereby enabling a tight sealing of the tyre with the rim flange. The bead base 14, extending from bead toe to bead heel, is configured to act as a seal when in contact with the rim flange, such that the space between innerliner 11 and the rim can be filled with compressed air. Innerliner 11 refers to a layer or layers of rubber or rubber based components. The innerliner 11 comprises a rubber composition configured to resist air diffusion. When the space between the rim and the pneumatic tyre is inflated with high-pressure air, the innerliner component reduces the air permeability of the tyre.

As described above with reference to FIG. 1, each tyre component comprising a rubber compound may be designed for a different purpose. Each component may therefore comprise a rubber compound designed to provide dedicated performance characteristics for the tyre.

The tyre construction and materials together define the performance characteristics of the tyre, once fabricated and cured. The rubber composition used in different parts of a tyre may be varied. The consistency may also vary depending of the tyre type. The consistency of a rubber based component of a summer tyre may be different than consistency of a rubber based component of a winter tyre. The consistency of a rubber based component between a studded tyre and an all season tyre may vary.

Carbon Black

Carbon black is typically used to provide tensile strength and wear resistance to a pneumatic tyre. Carbon black may be obtained by means of incomplete combustion of fossil carbon source, such as heavy petroleum products. The most common method of manufacturing carbon black is combustion of fossil oil or gas with oxygen inside a furnace, such that microscopic carbon particles are formed. In a furnace reactor, the reaction rate is typically controlled by quenching, which refers to spraying of steam or water into the carbon particles.

Conventional carbon black used in rubber components of a pneumatic tyre is mainly elemental carbon, wherein the size of an individual particle of carbon black is in the range of 10 to 500 nanometers. Depending of the furnace conditions and used fossil carbon source, individual particles of carbon black may be physically adhered to others of similar size, thereby forming a cluster of carbon black particles.

The cluster of carbon black particles typically consists of spherical particles agglomerated together. The particles are structures capable to absorb fluids and reinforce materials such as rubber. Fluid absorbancy is typically referred to as oil absorbancy, and is a measure of dibutyl phthalate absorption of the carbon black (ml/100 g). The reinforcing effect of carbon black is principally due to morphological characteristics of the particles, enabling physical interactions in the rubber based compound of a pneumatic tyre. In addition to elemental carbon, carbon black can contain very small quantities of other elements.

Carbon black can be graded e.g. based on ASTM D1765-14, which is used for classification of rubber-grade carbon blacks. The standard uses a four-character nomenclature system, wherein the first character indicates the influence on the rate of cure and the second character, denoting the group number, gives information on the specific surface area of the carbon black. The last two characters are assigned arbitrarily. For example, N330 indicates a carbon black wherein the first character, letter N, stands for a carbon black producing a normal cure rate and the second character 3 stands for specific surface area, typically in the range of 70 to 99 $m^2/g$. In general N100 to N300 grade carbon black have a specific surface area which is larger than the specific surface area of N500 to N900 grade carbon black. Typically, N500 to N900 grade carbon black comprise a specific surface area less than 70 $m^2/g$. The determination of specific surface area can be done according to standard ASTM D6556-10. Carbon black suitable for use in pneumatic tyres typically has a specific surface area of equal to or less than 150 $m^2/g$. The group number further correlates with the average particle size. In general, the lower the surface area of carbon black is, the lower is the cost and subsequently the poorer the reinforcement potential of the material.

While e.g. precipitated or fumed silica has been used as a substitute for carbon black as reinforcing material in rubber compositions for tyres, such raw materials have thus far been highly expensive compared to carbon black.

Lignin as a Source of Functional and Renewable Material for Pneumatic Tyre

Lignin that has been treated by hydrothermal carbonization, denoted as HTC lignin, provides a new means for improving tyre performance. HTC lignin may be manufactured from lignin containing material.

Lignin denotes a class of highly polymerized and branched, heterogeneous macromolecules present in vascular plants. Lignin provides rigidity and strength to cell walls of vascular plants. Plant lignin may be divided into three general classes comprising softwood (gymnosperm) lignin, hardwood (angiosperm) lignin and annual plant (graminaceous) lignin. In general, at least 15 wt. % of the dry weight of softwood or hardwood is lignin. In different tree species the wood lignin content can vary, typically in the range of 15 wt. % to 40 wt. %. Spruce and pine are particular examples of softwood sources having a high content of lignin. Wood based lignin is available as a by-product of the pulp and paper industry. Lignin that has been treated by hydrothermal carbonization may therefore comprise lignin of wooden origin, in particular lignin of softwood origin. HTC lignin may further be manufactured in biorefineries.

Lignin in native form has very high molecular weight. The molecular structure of lignin comprises phenylpropane ($C_9$) units, which are connected to each other, typically via carbon-carbon (C—C) and/or ether (C—O—C) linkages. The molecular structure of lignin thus comprises lignin precursor units, denoted as monolignols. When connected to each other, the monolignols form the biopolymer referred to as lignin. The lignin precursor units comprise different types of monolignols, such as coniferyl alcohol, sinapyl alcohol and/or p-coumaryl alcohol. Guaiacyl lignin refers to lignin comprising principally precursor units of coniferyl alcohol. Syringyl refers to lignin comprising precursor unit of both coniferyl alcohol and sinapyl alcohol. In general, softwood lignin comprises principally guaiacyl. Hardwood lignin typically comprises both guaiacyl and syringyl.

A Method for Hydrothermal Carbonization of Lignin

As described above, a hydrothermal carbonization treatment may be used to break the macromolecular structure of lignin. Lignin that has been treated by hydrothermal carbonization, denoted as HTC lignin, provides a renewable source of material, which may be used in a rubber compound of a pneumatic tyre.

Hydrothermal carbonization of lignin refers to a method comprising receiving lignin containing material and treating the lignin containing material in an aqueous suspension at elevated pressure and temperature. A hydrothermal carbonization of lignin thus comprises a stage, wherein lignin containing material is subjected to partial decomposition by means of heat in a liquid environment. A hydrothermal carbonization of lignin refers to a thermochemical process configured to convert lignin containing medium into a lignin derivative of substantially uniform quality, wherein the lignin derivative contains functional groups. The method may comprise selecting thermochemical conversion process conditions for treating the lignin containing material, such that lignin derivative with distinguishable characteristics may be obtained. Characteristics typical to lignin derivate may be determined from a rubber based component of a pneumatic tyre.

The method for hydrothermal carbonization of lignin further comprises at least partial refining of the lignin containing material. Typically, the lignin may be at least partially charred. During the hydrothermal carbonization treatment, the lignin is surrounded by water. The extent of decomposition of lignin in the hydrothermal carbonization may be adjusted, for example by means of process temperature, pressure, and/or by selecting the pH of the water suspension. The method for hydrothermal carbonization of lignin may comprise selecting the reaction conditions of the hydrothermal carbonization, thereby forming HTC lignin with defined properties. The method may comprise selecting the surrounding medium parameters, such as pH and pressure, the maximum temperature and/or the residence time of the input material, such that HTC lignin having different characteristics is obtained.

Hydrothermal carbonization of lignin may be carried out in a reactor. The reactor may be, for example, a batch reactor suitable for chemical reactions. Batch process, such as a single batch process, is an example of a convenient way to control the process conditions of a hydrothermal carbonization treatment. The method for hydrothermal carbonization of lignin may comprise controlling the internal pressure of the reactor such that the water inside the reactor is maintained in a liquid state during the hydrothermal carbonization. The internal pressure of the reactor during hydrothermal carbonization reaction may be in the range of 10 to 40 bar, preferably equal to or higher than 15 bar. The method for hydrothermal carbonization of lignin may comprise controlling the temperature of the aqueous suspension containing lignin, such that the lignin starts to break down to smaller fragments. The temperature of a hydrothermal carbonization reaction may be higher than 150° C. Typically, the temperature of a hydrothermal carbonization reaction is less 300° C., such as in the range of 150 to 250° C. The temperature of a hydrothermal carbonization reaction refers to the temperature of the aqueous suspension inside the reactor vessel during the hydrothermal carbonization reaction.

The method for hydrothermal carbonization of lignin may comprise controlling the pH of the aqueous suspension containing lignin. Lignin is highly soluble in alkaline conditions. The pH of the suspension containing lignin in the hydrothermal carbonization treatment has an effect on the particle size of the formed lignin derivative. The method for hydrothermal carbonization of lignin may comprise adjusting the pH of the suspension containing lignin to a pH value above 7, preferably above pH value 8. The pH of the aqueous suspension containing lignin may be adjusted before a hydrothermal carbonization treatment. In alkaline suspension, typically in a pH equal to or higher than 10, the polymerization of lignin may be suppressed. The particle size of HTC lignin is dependent of the pH chosen for the hydrothermal carbonization treatment. The method for hydrothermal carbonization of lignin may comprise reducing the hydrogen ion ($H^+$) concentration of an aqueous suspension containing lignin prior to hydrothermal carbonization, thereby reducing the particle size of the formed HTC lignin. The method for hydrothermal carbonization of lignin may comprise increasing the hydrogen ion ($H^+$) concentration of an aqueous suspension containing lignin prior to hydrothermal carbonization, thereby increasing the particle size of the formed HTC lignin. The particle size of HTC lignin refers to the average particle size after the hydrothermal carbonization treatment. The average particle size of HTC lignin can be determined by the same means as the average particle size of carbon black, as described above. The specific surface area of HTC lignin can be determined according to standard ASTM D6556-10, as described above.

Characteristics of HTC Lignin Suitable for Pneumatic Tyre

A HTC lignin particle comprises a polymeric structure, which may be arranged to provide a filler material, which is more flexible than silica or carbon black. Phenol groups and aromatic alcohols in the molecular chain may be arranged to provide rigidity into the structure of a rubber based component. Due to the polymeric structure of the HTC lignin particle, the link, referring to the distance, between the filler material and rubber may be extended. The linker thus becomes longer than with other conventional filler materials, such as silica. A rubber based component comprising HTC lignin therefore may provide higher tensile strength, higher tear resistance and/or improve abrasion resistance in a positive manner.

In general, HTC lignin suitable for a rubber based component of a pneumatic tyre may have a specific surface area of less than 150 $m^2$/g, when determined according to ASTM D6556-10, the specific surface area referring to the total surface area based on multipoint nitrogen adsorption. Typically, HTC lignin suitable for a rubber based component of a pneumatic tyre has a specific surface area of less than 100 $m^2$/g, such as in the range of 10 to 100 $m^2$/g, HTC lignin suitable for a rubber based component of a pneumatic tyre may have and oil absorption number of less than 130 ml/100 g, when measured according to ASTM D2414-09. Typically, HTC lignin suitable fora rubber based component of a pneumatic tyre has an oil absorption number of less than 120 ml/100 g, such as in the range of 60-100 ml/100 g. The oil absorption number correlates with the amount of fluid the material can absorb internally, and is proportional to the reinforcing capability of the material.

Elementary composition of HTC lignin typically comprises high amounts of elemental carbon. HTC lignin may contain elemental carbon 40 wt. % or more, such as in the range of 40 to 65 wt. %, or even higher. HTC lignin may contain oxygen less than 30 wt. %, typically in the range of 15 and 20 wt. %. HTC lignin may contain nitrogen less than 20 wt. %, typically in the range of 3 to 6 wt. %. HTC lignin may optionally contain minor amounts of sodium, such as equal to or less than 2 wt. %. HTC lignin may optionally contain minor amounts of sulphur, such as equal to or less than 3%. The elementary composition of HTC lignin, including the carbon content, may be determined by analytical methods for biochar analysis according to the European Biochar certificate (version 4.1, 4 Mar. 2014).

HTC Lignin Functional Groups

The chemical structure of HTC lignin may comprise different types of functional groups. The chemical structure of HTC lignin typically comprises functional groups such as hydroxyl, carboxyl, methoxy and/or phenolic hydroxyl groups. A method to detect functional groups present in HTC lignin may comprise analyzing the HTC lignin by an analytical method, such as Fourier transform infrared spectroscopy (FTIR), nuclear magnetic resonance of phosphorus ($^{31}$P-NMR) or Heteronuclear Single Quantum Correlation (HSQC) spectroscopy. Such analytical method is typically performed with an analytical instrument suitable for such method and according to the manufacturer's instructions.

HTC lignin comprises a molecular structure, which has capability to reinforce a rubber based component both by physical interaction as well as chemical bonding. The molecular structure of HTC lignin is much more complex than the structure of conventional fillers, such as carbon black, for example. HTC lignin contains less aliphatic hydroxyl groups than non-processed lignin. Non-processed lignin refers to lignin in native form.

The method for hydrothermal carbonization of lignin comprises enrichment of the of the carbon content of the lignin. Hydrothermal carbonization of lignin thus involves reactions, which are configured to increase the carbon content of the input material. The enrichment of the carbon content of the lignin treated by hydrothermal carbonization may occur by means such as dehydration and decarboxylation, which result in formation of carbon dioxide ($CO_2$), oxygen and hydrogen cleavage. At lower temperatures, the dehydration dominates, at higher temperatures the decarboxylation dominates. At higher temperature more carbon is thus cleaved off. At higher temperatures both the dehydration and the decarboxylation reactions proceed more rapidly. Hence, the method for hydrothermal carbonization of lignin may comprise increasing the temperature of the reaction temperature, thereby reducing the residence time.

Hydrothermal carbonization treatment of lignin has the effect of preserving the surface active functional groups of the input lignin containing material, to at least some extent. HTC lignin thus comprises functional groups which are capable of bonding with other compounds in a chemical reaction. A hydrothermal carbonization of lignin provides material having relatively high amount of surface active functional groups. By relatively high amount of surface active functional groups it is meant, that after the hydrothermal carbonization of lignin the amount of functional groups, such as aliphatic hydroxyl groups, may be less than the amount of functional groups before the hydrothermal carbonization of lignin. The amount of functional groups is however, considerably higher than in carbon black, for example.

The method for hydrothermal carbonization of lignin comprises producing degraded fragments of lignin, denoted as lignin derivatives. Lignin that has been treated by hydrothermal carbonization process thus comprises lignin derivatives. An example of a lignin derivative is 2-methoxyphenol, also referred to as o-guaiacol. By controlling the conditions and duration of the hydrothermal carbonization treatment, the characteristics of the produced lignin derivatives may be affected. For example, the lignin derivatives may be arranged to link to each other. Such linking may occur, for example, via elimination and/or condensation reactions.

Chemical Bonding of a Rubber Compound Comprising HTC Lignin

The functional groups in HTC lignin are capable of forming chemical bonds. A rubber based component of a pneumatic tyre which comprises HTC lignin may form chemical bonds. HTC lignin may react with rubber compounds by different types of reaction mechanisms.

Figure 2:
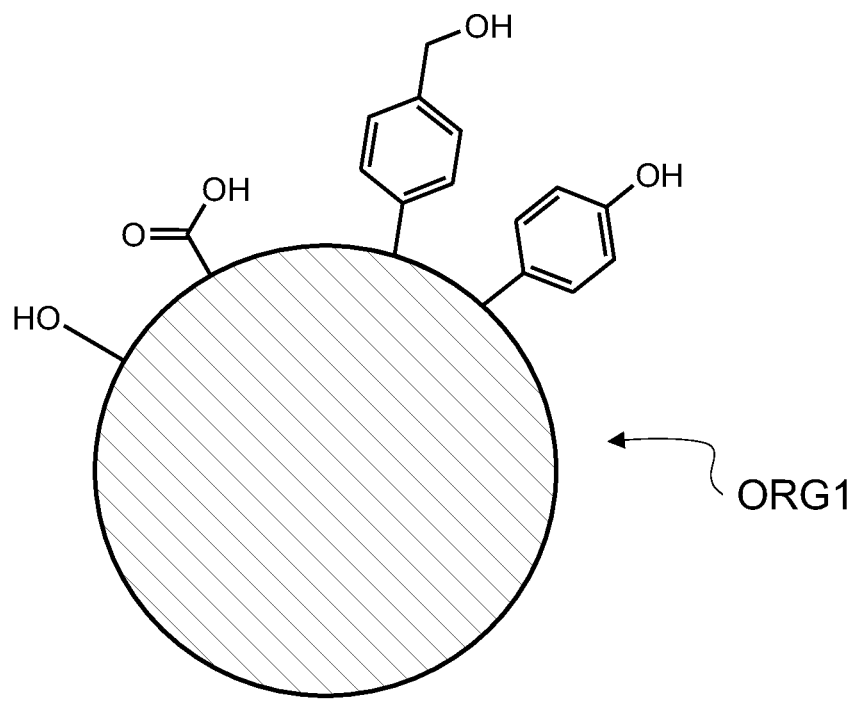
FIG. 2 illustrates, by way of an example, different types of functional groups of HTC lignin, which may be available for chemical reactions.
Figure 3:
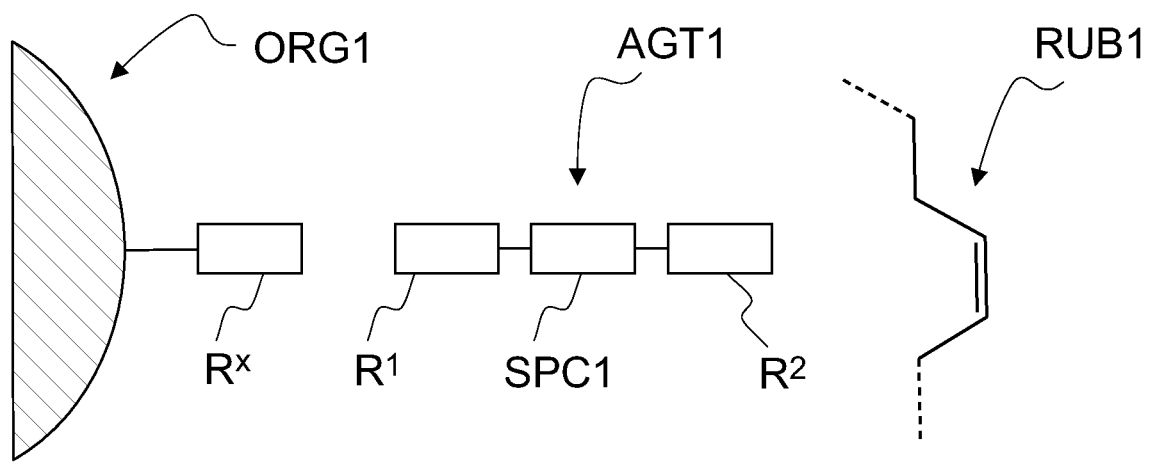
FIG. 3 illustrates, by way of an example, the concept of using an organic molecule as a coupling agent for coupling HTC lignin and rubber together.

With reference to FIGS. 2 and 3, HTC lignin ORG1 may comprise a variety of different types of functional groups $R^x$. HTC lignin ORG1 may comprise a number of functional group $R^x$. Each functional group $R^x$ may independently be, for example, a hydroxyl group (—OH),
a carboxyl group (—COOH),
a benzylic hydroxyl group (—$C_7H_8O$) or
a phenolic hydroxyl group (—$C_6H_5OH$).

The functional group $R^x$ is a surface active group, which is capable of reacting with a functional group $R^1$ of a coupling agent. A coupling agent refers to an organic molecule AGT1 comprising a first functional group $R^1$ capable to form a covalent bond with a functional group $R^x$ of HTC lignin ORG1 and a second functional group $R^2$ capable to form a covalent bond with a rubber compound RUB1. The first functional group $R^1$ and the second functional group $R^2$ of the organic molecule AGT1 may be separated by an organic spacer SPC1.

The first functional group $R^1$ of the organic molecule AGT1 may independently be, for example, an group, an epoxy group, a beta-keto ester group, a phenol hydroxyl group or a silanol group. The second functional group $R^2$ of the organic molecule AGT1 may independently be, for example, a vinyl group (—CH=$CH_2$), a thiol group (—SH) or a sulphur chain (—S—$(S)_n$—S—), wherein n represents the number of sulphur atoms. The number of sulphur atoms is typically equal to or less than 20, such as between 1 and 20. The organic spacer SPC1 may be a hydrocarbon chain of variable length. The spacer SPC1 may have a linear, branched or cyclic structure. The spacer SPC1 may contain saturated and/or unsaturated bonds. The spacer SPC1 may contain heteroatoms, such as nitrogen, oxygen or sulphur.

HTC lignin may be arranged to comprise one or more distinct structural features, which enable a chemical reaction mechanism to take place. Such HTC lignin is suitable for chemical interaction in a rubber based component of a pneumatic tyre. HTC lignin may be arranged to comprise carbolic acid functionality. Carbolic acids in this context refer to phenols.

HTC lignin is a macromolecule, which may be arranged to comprise phenolic rings, wherein at least some of the phenolic rings contain a free ortho-position on the phenolic ring. The free ortho-position on the phenolic ring enables electrophilic aromatic substitution reactions. An example of an electrophilic aromatic substitution reaction is a reaction of HTC lignin with a methylene donor, such as hexamethylenetetramine or hexa(methoxymethyl)melamine.

An example of a compound having a free ortho-position on the phenolic ring is 2-methoxyphenol. A rubber based component of a pneumatic tyre may comprise HTC lignin and 2-methoxyphenol. A rubber based component of a pneumatic tyre may comprise HTC lignin, wherein the HTC lignin macromolecule is configured to have aromatic reactivity by means of free phenolic hydroxyl groups. HTC lignin may comprise structure, wherein 2-methoxyphenol is covalently bound to the macromolecular structure of the HTC lignin. Such HTC lignin is in this context referred to as HTC lignin having 2-methoxyphenolic functionality. 2-methoxyphenol may be bound to HTC lignin such that the free phenolic hydroxyl group of the 2-methoxyphenol is in a para-position. A rubber based component may in addition be arranged to contain HTC lignin and 2-methoxyphenol, such that the 2-methoxyphenol is present as a separate substance, such as aromatic oil. Aromatic oils are typically volatile and may generate a distinct odour when evaporating. The presence of 2-methoxyphenolic functionality in a rubber based component may be detected, both when present as a covalently bound structure or as a volatile substance.

The presence of 2-methoxyphenol may be detected, for example, from a pyrolysis product of a cured rubber based component of a pneumatic tyre. HTC lignin containing 2-methoxyphenol and/or 2-methoxyphenolic functionality has been observed to be particularly suitable for use in a rubber based component of a pneumatic tyre.

HTC lignin may be arranged to comprise phenolic rings, wherein at least some of the phenolic rings contain a phenoxide ion. A phenoxide ion is highly reactive towards an electrophilic attack. A phenolic ring with free ortho-position may also react with β-ketoesters via Pechmann condensation to form a coumarin type structure.

HTC lignin may be arranged to comprise hydroxyl groups. HTC lignin comprising one or more hydroxyl groups may be arranged to react via different chemical reaction mechanisms. HTC lignin may comprise hydroxyl groups, which are aliphatic, phenolic or a combination of both. The aliphatic hydroxyl groups may be primary and/or secondary hydroxyl groups. HTC lignin comprising hydroxyl groups may be arranged to participate in different types of chemical reactions. Hydroxyl groups of HTC lignin may participate in a tosyl-activated reaction, in an opening reaction with an epoxide, in an esterification with carboxylic acid and anhydride or in a silylation reaction with a silane. For example, a hydroxyl group of the HTC lignin may react with a coupling agent comprising an alkyl tosylate via nucleophilic substitution, referred to as $S_N 2$ mechanism. Alternatively, a hydroxyl group of the HTC lignin may react with a coupling agent containing an epoxide ring, thereby causing the epoxide ring to open and enabling a covalent bond to form between the HTC lignin and the coupling agent. HTC lignin may react with a coupling agent containing an ester, wherein the carbonyl carbon of the ester may be attacked by an alkoxide ion or phenolic hydroxyl group acting as a nucleophile via an addition reaction, followed by elimination of yet another alkoxide ion or alcohol, thereby forming a covalent bond between the HTC lignin and the coupling agent. HTC lignin may react with a coupling agent containing beta-keto ester, such that an esterification reaction takes place, followed by ring closure and lactone formation, thereby forming a covalent bond between the HTC lignin and the coupling agent. In each example above, the coupling agent may in addition to the first functional group comprise a second functional group capable to form a covalent bond with a rubber compound, such that the HTC lignin and rubber may be cross-linked together by means of a coupling agent. The coupling agent may be used as a means for coupling HTC lignin and rubber compound, thereby modifying the viscoelastic properties of a rubber based component.

Figure 4:
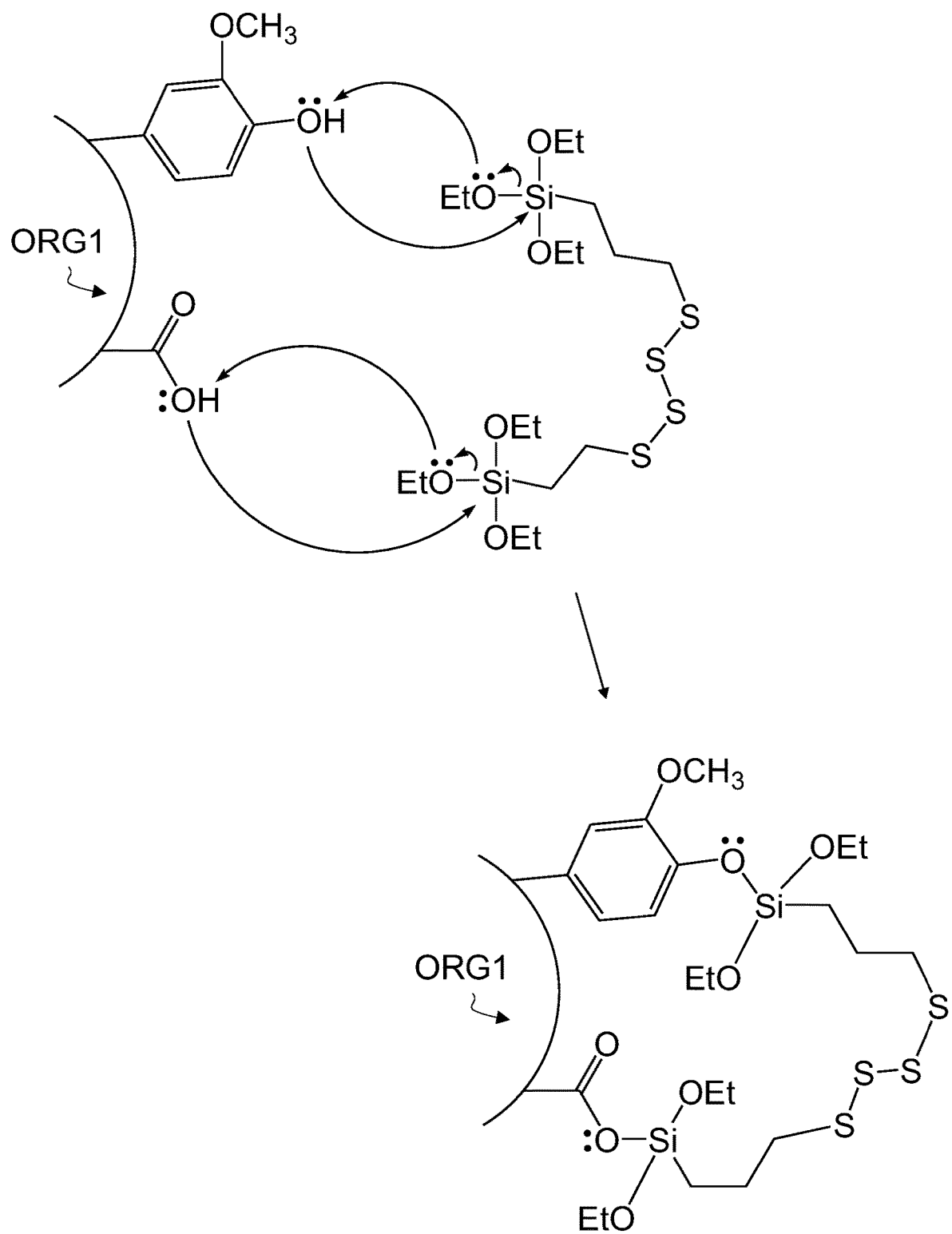
FIG. 4 illustrates, by way of an example, a nucleophilic substitution reaction wherein a silane based coupling agent such as TESPT in used to couple HTC lignin and rubber together.

Referring to FIG. 4, HTC lignin ORG1 may react with the coupling agent via nucleophilic substitution reaction. An example of a nucleophilic substitution is the reaction between bis-[3-(triethoxysilyl)-propyl]-tetrasulfide and HTC lignin ORG1. Bis-[3-(triethoxysilyl)-propyl]-tetrasulfide, hereafter referred to as TESTP, is an example of a silane based coupling agent. The silanol groups of TESPT, i.e. triethoxysilyl groups, are capable of reacting with HTC lignin containing a hydroxyl group. The structure of HTC lignin may contain a carboxyl group and/or a phenyl group, which both contain a hydroxyl group. Both the carboxyl group and the phenyl group are independently suitable for reaction with a silanol group of a coupling agent. The silanol group of TESPT may further react with synthetic or natural rubber, such a styrene-butadiene rubber. When acting as a coupling agent, TESPT may form a first chemical bond with HTC lignin and a second chemical bond with rubber, thereby forming a structure in the rubber based component, wherein the HTC lignin and rubber have been cross-linked together by means of a coupling agent. TESPT therefore may act as an interfacial coupling layer between HTC lignin and rubber in the rubber based component.

HTC lignin may be used together with a methylene donor compound in a rubber based component of a pneumatic tyre to provide a component comprising high modulus, stiffness and reinforcement. A methylene donor compound is typically capable of generating formaldehyde when subjected to heating. Traditionally, a rubber based component comprising high modulus, stiffness and reinforcement has been obtained by mixing methylene donor compound and phenolic resin. The phenolic resins react with the methylene donor compound during vulcanization process, thereby creating a reinforcing network structure to the cured rubber based component. At the same time the brittleness and hardness of the cured rubber based component is highly increased and elasticity is highly decreased. As an alternative for high stiffness, the rubber based component may comprise high amounts of reinforcing filler and a curing chemical, such as sulphur or sulphur donor. However, the reinforcing effect is not as high as with phenolic resins with methylene donor compound. HTC lignin may interact with a methylene donor compound, thereby providing a cross-linked polymer structure which has the capability to reinforce a rubber based component of a pneumatic tyre. The combination acts as a reinforcing agent capable of forming network structures. A rubber based component comprising HTC lignin is particularly suitable with a methylene donor compound, when the rubber based component comprises HTC lignin in amounts less than 10% by weight of the rubber based component, such as in the range of 0.5 to 9.5 wt. %, preferably in the range of 2 to 9 wt. %, of the total weight of the rubber based component. A rubber based component comprising HTC lignin and a methylene donor compound is preferably a non-tread area component, such as a sidewall area component or a bead area component of a pneumatic tyre. Sidewall in particular needs to withstand flexing.

A methylene donor compound suitable for use with HTC lignin is a compound, which is capable to form a network structure with lignin that has been treated by hydrothermal carbonization. An example of a methylene donor compound is a polyamine based hardening resin. A polyamine based hardening resin refers to a compound that may with HTC lignin undergo a self-condensation reaction. Such compound is under acidic conditions capable to form a network structure with lignin that has been treated by hydrothermal carbonization. By "under acidic conditions" it is meant, that a methylene donor compound suitable for use with HTC lignin has an affinity to form a network structure with HTC lignin, which can be demonstrated under controlled conditions e.g. in a laboratory experiment. HTC lignin comprises one or more functional groups capable of forming chemical bonds, which may be arranged to form a network structure with such methylene donor compound. Examples of a polyamine based hardening resin are compounds such as hexamethylenetetramine and hexa(methoxymethyl)melamine, typically abbreviated as HMT and HMMM, respectively. The combination of HTC lignin and polyamine based hardening resin may be used to improve the abrasion resistance and initial tear strength of a rubber based component of a pneumatic tyre.

The amount of methylene donor compound to be used together with the HTC lignin may be selected depending of the chemical composition of the methylene donor compound. Typically, the concentration ratio of phenol groups (with free ortho position) of the HTC lignin and amino groups of the methylene donor in the reaction may be stoichiometric. However, the amount of the methylene donor may be lower or higher than the amount of phenol groups of the HTC lignin, if desired. In particular, when the methylene donor amount is lower, the brittleness of the formed reinforcing, cross-linked polymer structure is not too high. The ratio of the methylene donor compound to the HTC lignin may be in the range 1:20 to 10:1, preferably in the range of 1:10 to 3:1, determined as a weight ratio. Reaction with the HTC lignin and the methylene donor increases the stiffness and strength of the rubber based component and decreases the heat generation without significantly affecting the break strain and elasticity of the rubber based component, when compared to a rubber based component having a phenolic resin based network structure.

Figure 5:
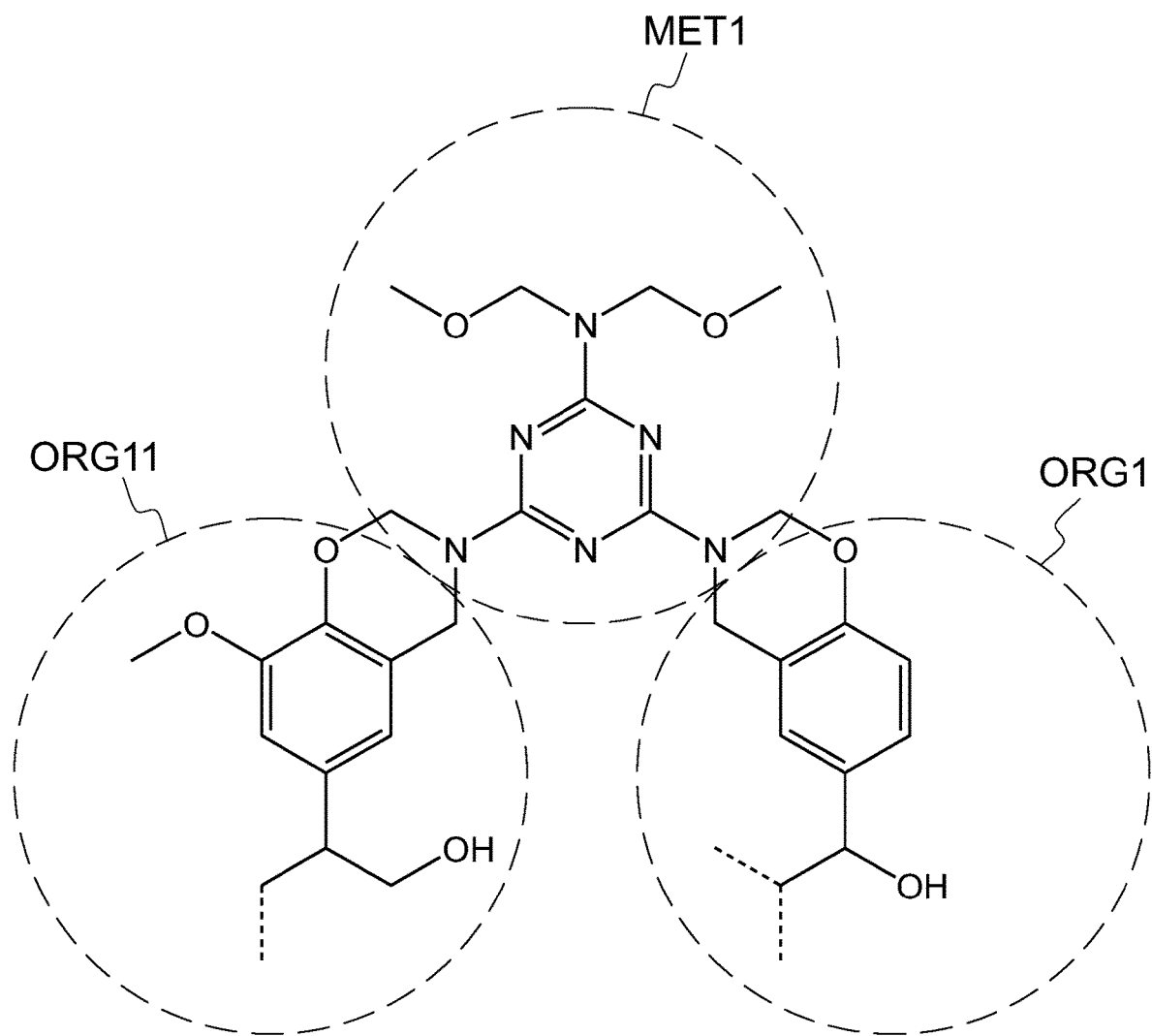
FIG. 5 illustrates, by way of an example, the concept of using a methylene donor compound, such as hexa (methoxymethyl)melamine, for linking together multiple separate HTC lignin particles.

Referring to FIG. 5, the organic molecule may be a methylene donor compound MET1, such as hexa(methoxymethyl)melamine, linking together multiple separate HTC lignin molecules, such as a first HTC lignin molecule ORG1 and a second HTC lignin molecule ORG11, thereby enabling a cross-linking structure to be formed in a rubber based component.

Figure 6:
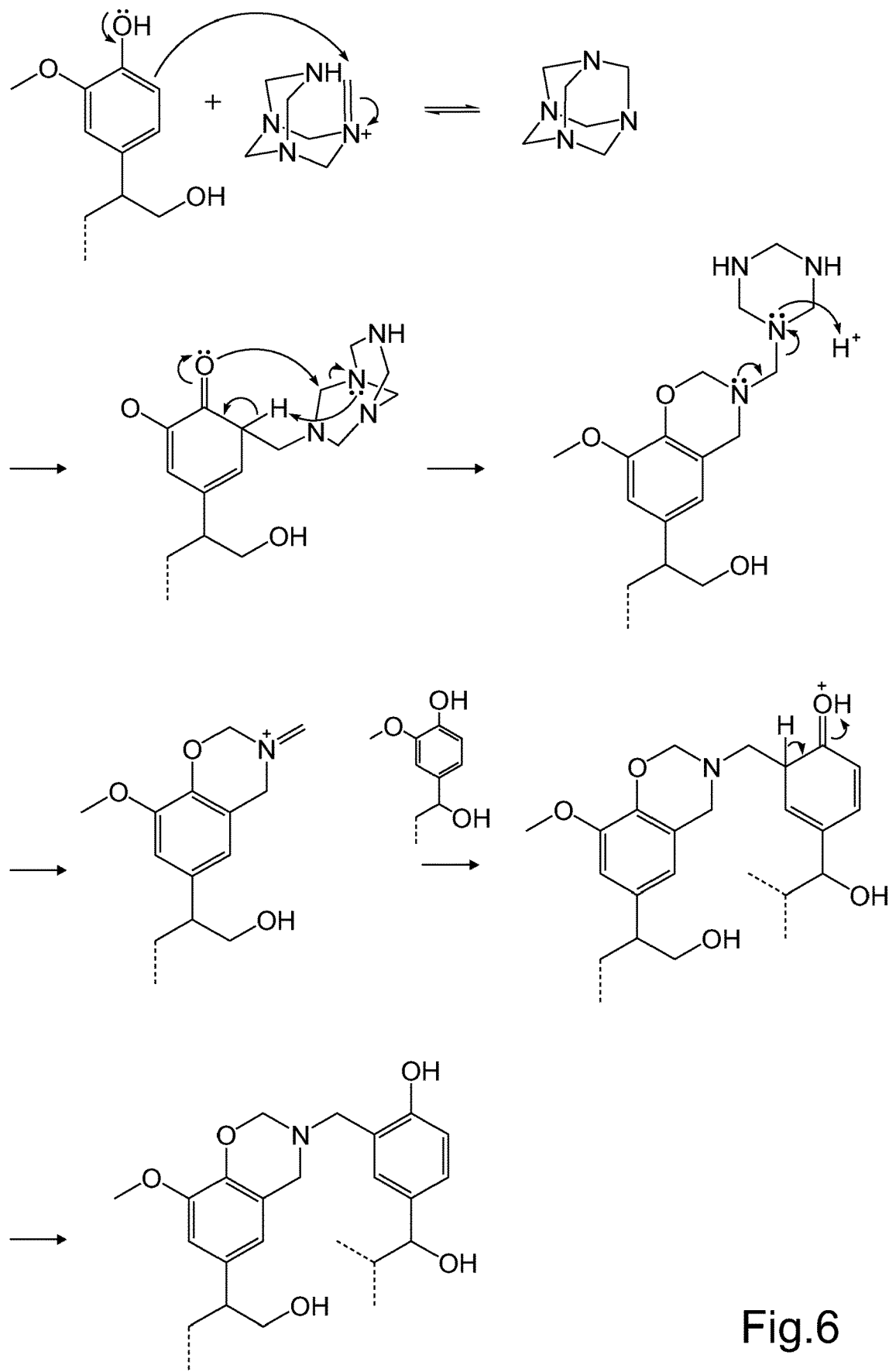
FIG. 6 illustrates, by way of an example, the concept of using a phenol group of the HTC lignin with a methylene donor compound in order to form a cross-linked structure in a rubber based component of a pneumatic tyre.

Referring to FIG. 6, a phenol group of the HTC lignin may react with a methylene donor compound, in this case hexamethylenetetramine. The reaction may take place in an acid catalyzed reaction. A methine group formed in the equilibrium reaction under acidic conditions reacts into the ortho-position in the phenol ring of the HTC lignin. In a subsequent reaction, a heterocyclic ring structure bearing an iminium ion is formed. The formed iminium ion reacts further via an electrophilic aromatic substitution with a phenol ring of another HTC lignin molecule. Hexamethylenetetramine thus links separate HTC lignin molecules together, thereby enabling a cross-linking structure to be formed in a rubber based component. HTC lignin may be configured to react with a methylene donor compound such as hexamethylenetetramine in a similar manner as phenol-formaldehyde resins, generally referred to as phenolic resins or novolacs. HTC lignin may thus be used to replace phenolic resins in rubber based components of a pneumatic tyre.

HTC Lignin Amounts in a Rubber Based Component of a Pneumatic Tyre

The characteristics of a rubber based component of a tyre may be chosen, for example, by selecting the HTC lignin content, particle morphology, particle size, and/or average particle size distribution used for said rubber based component. For the purpose of replacing carbon black, a rubber based component of a pneumatic tyre may typically comprise HTC lignin in an amount of equal to or less than 75 wt. %, such as in the range of 1 to 70 wt. %, of the total weight of the rubber based component.

For the purpose of replacing a defined grade of carbon black, having a defined reinforcing effect, the HTC lignin to be added into a rubber composition may be selected such that the specific surface area of the HTC lignin produces a reinforcing effect corresponding to the reinforcing effect of carbon black grade being replaced. A method for manufacturing a pneumatic tyre for a vehicle may comprise receiving a rubber based component comprising HTC lignin. The method may comprise receiving a rubber based component, wherein HTC lignin has been mixed with rubber after polymer addition. Other raw materials of the rubber based component have preferably been added later, after the HTC lignin has been mixed with the rubber. Preferably, HTC lignin has been mixed with the rubber at a temperature in the range of 130° C. to 170° C. Temperatures lower than 130° C. may not be high enough to achieve chemical bonding of HTC lignin with coupling agent. In temperatures above 170° C. polymer compounds typically added into the rubber composition of a pneumatic tyre may break down, which may lead to reduced characteristics of the rubber based component comprising HTC lignin.

The characteristics of a rubber composition in a tyre component may be further affected by a combination of HTC lignin and a coupling agent. When the rubber based component further comprises a silane based coupling agent, HTC lignin has preferably been mixed with the rubber at a temperature in the range of 130° C. to 160° C. When the coupling agent is bis-[3-(triethoxysilyl)-propyl]-tetrasulfide (TESPT), HTC lignin has preferably been mixed with the rubber at a temperature in the range of 130° C. to 160° C. Temperatures higher than 160° C. can cause polysulfide chains of TESPT to break down, thereby causing pre-vulcanization.

A cured rubber based component of a pneumatic tyre may comprise HTC lignin in an amount of equal to or less than 75 wt. %, preferably in the range of 1 to 70 wt. %. Cured rubber based component comprising HTC lignin in amounts equal to or more than 10 wt. % are contemplated to be particularly beneficial for reducing rolling resistance of a pneumatic tyre, in particular when the rubber based component is located in a non-tread area of the tyre, such as in the sidewall or bead area components. Preferably, the cured rubber based component may comprise HTC lignin equal to or more than 10 wt. %, such as in the range of 20 to 60 wt. %, of the total weight of the cured rubber based component, when used for reducing rolling resistance of a pneumatic tyre.

When the rubber based component is located in a tread or non-tread area of the tyre in combination with a coupling agent, the rubber based component may comprise HTC lignin in the same amounts as disclosed above. The HTC lignin in the rubber based component may be used to reduce the amount of silica. HTC lignin in the rubber based component may replace silica in whole. HTC lignin comprises novel properties compared to conventional carbon black or silica, as the amount of physical and chemical interaction of the filler with the rubber compounds may be adjusted. The amount of physical and chemical interaction of the filler with the rubber compounds may be adjusted, for example, by selecting the a coupling agent and the amount of coupling agent.

Figure 7:
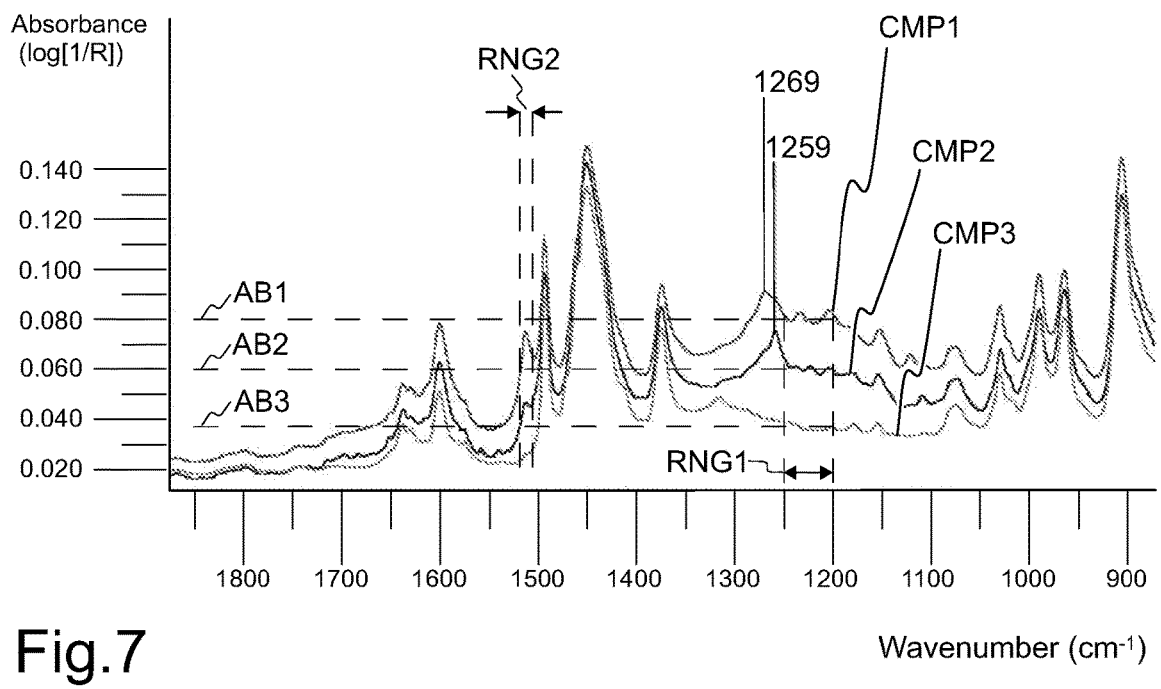
FIG. 7 represents, by way of examples, the results of a Pyrolysis-Fourier transform infrared spectroscopy (pyro-FTIR) scan over a wavenumber range of ca. 850-1950 cm$^{-1}$ of pneumatic tyre samples.

A Method for Detecting Functional Groups of HTC Lignin from a Rubber Based Component of a Pneumatic Tyre Referring to FIG. 7. Functional groups of lignin and lignin derivatives may be detected from a cured rubber based component by analytical methods. FIG. 7 is a diagram representing results of a Pyrolysis-Fourier transform infrared spectroscopy (pyro-FTIR) analysis, performed to three tyre samples CMP1, CMP2 and CMP3 according to standard ASTM D3677-10. The FTIR instrument was Nicolet iS10 (ThermoFisher Scientific) with diamond ATR unit, used according to manufacturer's instructions.

Each sample CMP1, CMP2, CMP3 of cured rubber based component was pyrolysed at 600° C. At this temperature each sample was converted to a pyrolysis product. Sample CMP1 was a cured rubber based component comprising 46 phr of lignin that had not been treated by hydrothermal carbonization. Sample CMP2 was a cured rubber based component comprising 46 phr of HTC lignin, referring to lignin that had been treated by hydrothermal carbonization.

Sample CMP3 was a cured rubber based component comprising 46 phr of N660 grade carbon black. Sample CMP3 was a reference sample, which did not contain lignin in any form.

Figure 8:
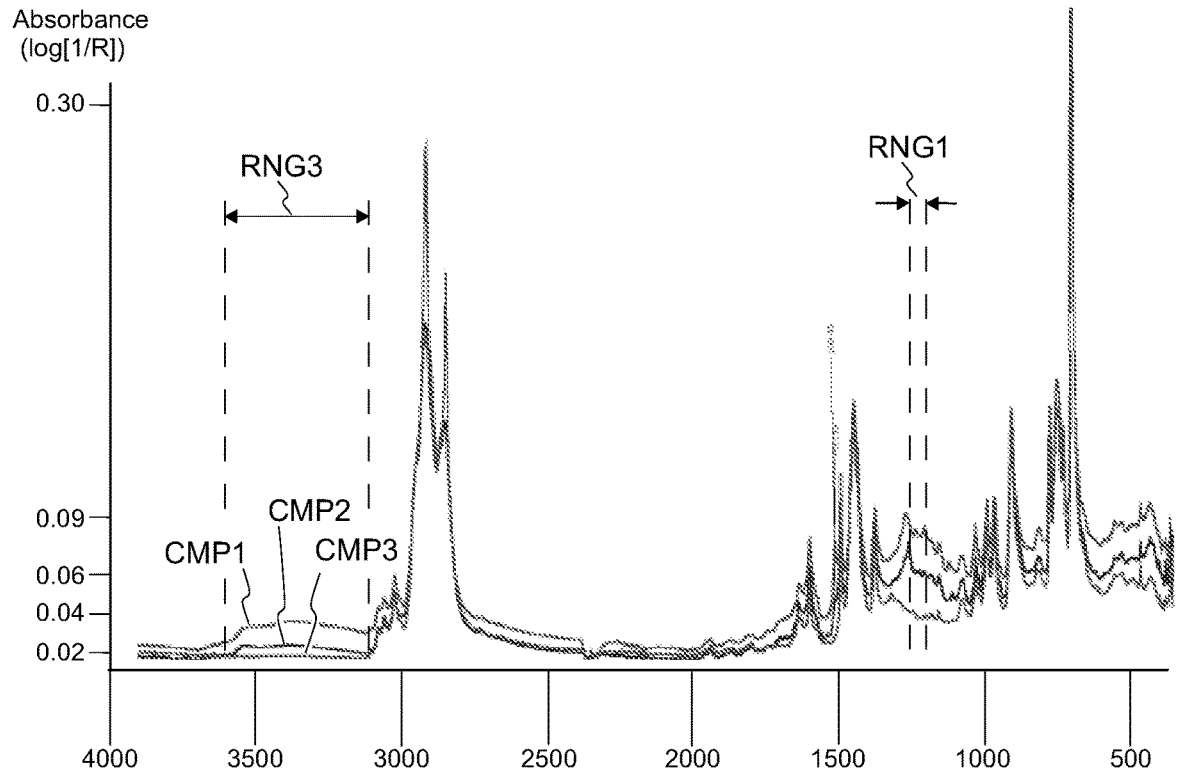
FIG. 8 represents, by way of examples, the results of a Pyrolysis-Fourier transform infrared spectroscopy (pyro-FTIR) scan over mid-infrared range of pneumatic tyre samples.

FTIR analysis is a measure how well a sample absorbs infrared radiation at each wavelength. FTIR diagram represents a spectrum of the signal absorbance at a selected wavelength range. The mid-infrared range, corresponding to wavenumbers approximately within the range of 4000 to 400 $cm^{-1}$, may be used to study the fundamental vibrations and associated rotational-vibrational structure. In FIG. 8, the vertical axis represents the signal absorbance measured in logarithmic units of reflectance R (log [1/R]). The horizontal axis represents the wave number ($cm^{-1}$). FTIR allows qualitative analysis of the cured rubber component, as different chemical bonds have specific vibrational properties at given wave numbers, which may be detected.

The results of FTIR analysis demonstrate that the sample CMP1 comprises an infrared spectrophotometry absorption band in the range of 1259 to 1269 $cm^{-1}$. The band comprises two peaks, the peak with higher absorbance, denoted as peak maximum, positioned around 1269 $cm^{-1}$. The absorbance intensity level at peak maximum, positioned around 1269 $cm^{-1}$, was approximately 0.09, which intensity level clearly differs from the baseline intensity level of the neighboring range. The results of FTIR analysis further demonstrate that the sample CMP2 also comprises an infrared spectrophotometry absorption band in the wavenumber range of 1259 to 1269 $cm^{-1}$. The band also comprises two peaks, the peak with higher absorbance, denoted as peak maximum, positioned around 1259 $cm^{-1}$. The absorbance intensity level at peak maximum, positioned around 1259 $cm^{-1}$, was approximately 0.07, which intensity level clearly differs from the baseline intensity level of the neighboring range. Said wavenumber band in the range of 1259 to 1269 $cm^{-1}$ is characteristic to C—O bond of phenolic groups and/or aromatic structures comprising hydroxyl-, carboxyl- and/or metoxy groups. Such groups are typical in lignin that has been treated by hydrothermal carbonization. The sample CMP3 does not comprise an infrared spectrophotometry absorption band in the range of 1259 to 1269 $cm^{-1}$. The absorbance intensity level at the range of 1259 to 1269 $cm^{-1}$ was approximately 0.04, which intensity level does not significantly differ from the baseline intensity level of the neighboring range. HTC lignin, when pyrolysed at 600° C. according to standard ASTM D3677-10, thus comprises an infrared spectrophotometry absorption peak maximum around 1259 $cm^{-1}$. Thus, FTIR absorption in this range may be used as specific indication means for detecting the presence of lignin or lignin derivative in a cured rubber based component of a tyre.

The results of the FTIR analysis further demonstrate an absorbance intensity level difference between the samples CMP1, CMP2 comprising lignin or HTC lignin and the sample CMP3 not containing any lignin derivative. In a first wavenumber range RNG1 of 1200 to 1250 $cm^{-1}$, sample CMP1 has an absorbance intensity level AB1 close to 0.08 in logarithmic absorbance units (log [1/R]), sample CMP2 has an absorbance intensity level AB2 close to 0.06 in logarithmic absorbance units (log [1/R]) and sample CMP3 has an absorbance intensity level AB2 close to 0.04 in logarithmic absorbance units (log [1/R]). This absorbance intensity level difference is most likely related to asymmetric stretching vibrations of C—O—C linkages in ethers and esters of lignin derivatives, which may be present in the samples CMP1 and CMP2. A similar absorbance intensity level difference between the samples CMP1, CMP2 comprising lignin or HTC lignin and the sample CMP3 not containing any lignin derivative is demonstrated in a second wavenumber range RNG2 around 1515 $cm^{-1}$. Thus, FTIR absorption intensity level in either the first or both of the first and second ranges RNG1, RNG2 may be used as specific indication means for determining the presence of lignin or lignin derivative from a cured rubber based component of a tyre.

FIG. 8 is a diagram representing the Pyrolysis-Fourier transform infrared spectroscopy (pyro-FTIR) analysis on mid-infrared range to samples CMP1, CMP2 and CMP3 according to standard ASTM D3677-10, as disclosed above. The results of the FTIR analysis demonstrate a further absorbance intensity level difference between the samples CMP1, CMP2 comprising lignin or HTC lignin and the sample CMP3 not containing any lignin derivative. In a third wavenumber range RNG3 of 3600 to 3100 $cm^{-1}$, sample CMP3 has an absorbance intensity level, which is lower than the absorbance intensity level of either sample CMP1 comprising lignin or sample CMP2 comprising HTC lignin. This absorbance intensity level difference is most likely related to vibrations of hydroxyl groups of lignin derivatives, which may be present in the samples CMP1 and CMP2.

Figure 9:
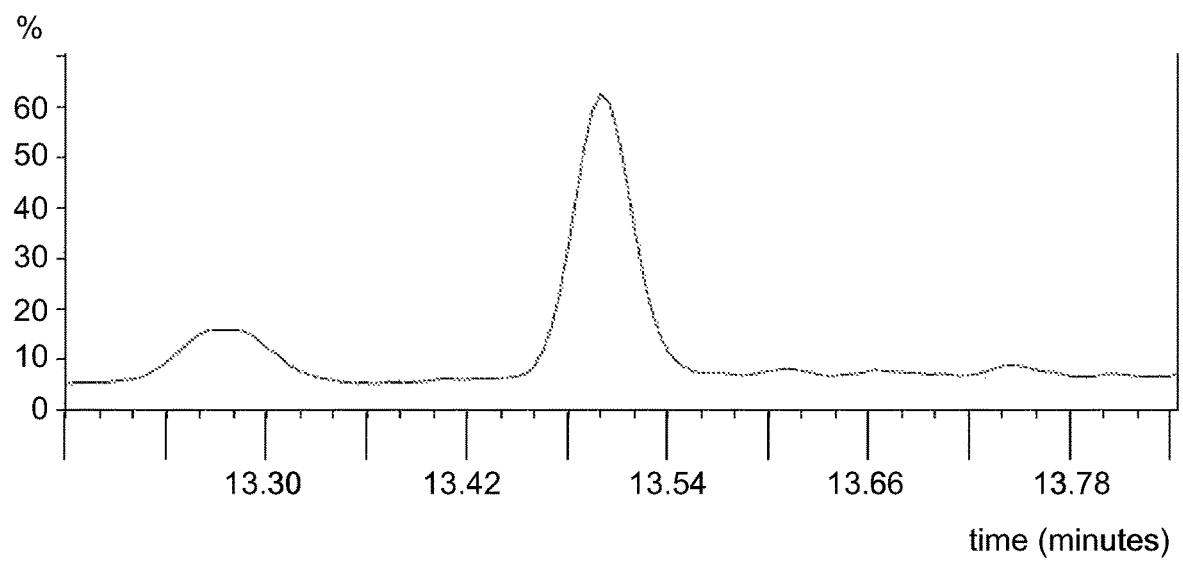
FIG. 9 represents, by way of an example, a GC chromatogram of a pyrolysed sample comprising HTC lignin, displaying a spectral peak having a retention time around 13.5 minutes.
Figure 10:
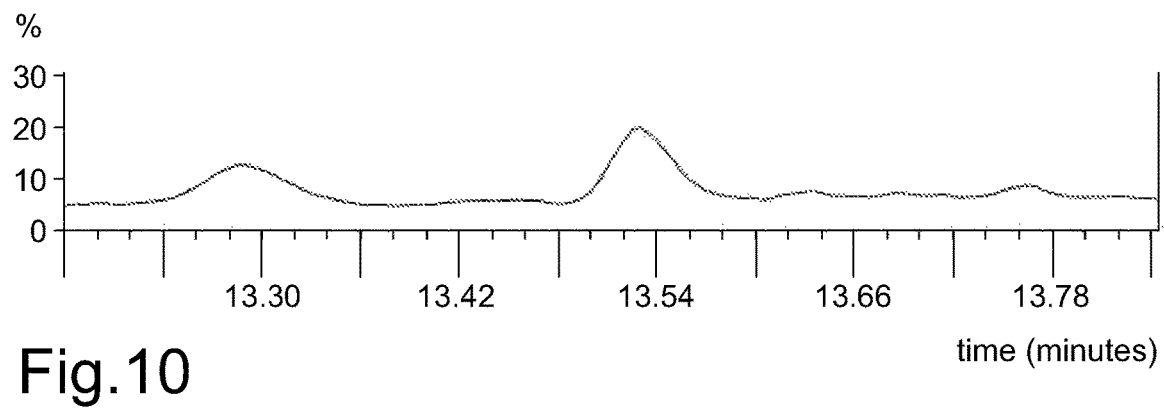
FIG. 10 represents, by way of an example, a GC chromatogram of a pyrolysed sample comprising lignin, displaying a significantly smaller spectral peak having a retention time around 13.5 minutes.
Figure 11:
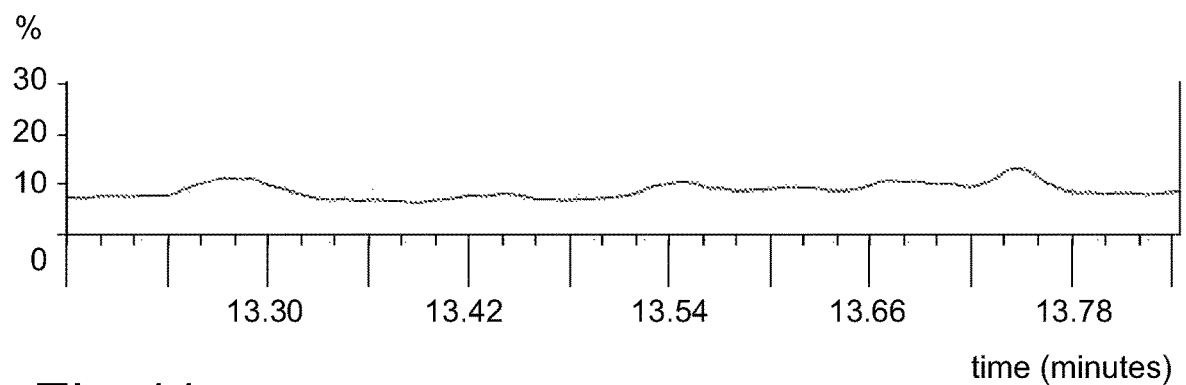
FIG. 11 represents, by way of an example, a GC chromatogram of a pyrolysed sample comprising carbon black, which does not display a spectral peak with a retention time around 13.5 minutes.

A Method for Detecting HTC Lignin from a Rubber Based Component of a Pneumatic Tyre by Gyro-GC-MS Analysis Referring to FIGS. 9, 10 and 11. The hydrothermal carbonization treatment produces lignin derivatives with distinguishable characteristics, which may be detected from a cured rubber component of a pneumatic tyre. Thus, the presence of HTC lignin may be detected from a rubber based component of a pneumatic tyre by an analytical method known as pyrolysis-gas chromatography-mass spectrometry, abbreviated as pyro-GC-MS. Pyro-GC-MS is a chemical analysis method in which a sample is pyrolysed, thereby producing a pyrolysis product of the cured rubber component of a pneumatic tyre. When performing a pyrolysis-gas chromatography-mass spectrometry analysis on a cured rubber based component, such as vulcanized rubber product, the cured rubber based component is first treated by acetone. Acetone treatment, typically referred to as acetone extraction, removes rubber resins, free sulfur, acetone-soluble plasticizers, processing aids, mineral oils or waxes, acetone-soluble antioxidants and organic accelerators or their decomposition products, and fatty acids. It also removes part of bituminous substances, vulcanized oils, high molecular mass hydrocarbons, and soaps. The portion extracted from the cured rubber based component is generally called an acetone extract. An acetone extract treatment suitable for a cured rubber based component is described in sections 18 and 19 of the standard D297-93 (reapproved 2006). A pyrolysis-gas chromatography-mass spectrometry analysis may be performed on the remaining part of the cured rubber based component, after acetone extraction treatment. Pyrolysis refers to thermal decomposition of material in an inert atmosphere or a vacuum. The pyrolysis product comprises smaller molecules, which are further separated by gas chromatography. In general, each separated smaller molecule of the pyrolysis product has a specific retention time, referring to the time from sample injection to sample elution in the gas chromatography column. Each separated smaller molecule having a specific retention time may be further identified using mass spectrometry downstream of the gas chromatography column. In FIGS. 9, 10 and 11, the vertical axis represents the response of the GC detector unit to each peak in percentage units (%). The horizontal axis represents the retention time from sample injection in minutes. The minutes are displayed as discrete minutes with hundredth parts.

FIG. 9 represents a pyrolysis GC chromatogram of a first sample from cured rubber based component of a pneumatic tyre comprising HTC lignin after acetone extraction treatment, as described above. The sample was a cured rubber based component comprising 46 phr of HTC lignin, referring to lignin that had been treated by hydrothermal carbonization, and corresponded to the sample CMP2 of the FTIR analysis. The sample was pyrolysed at 550° C. according to standard ASTM D3452-06, thereby producing material referred to as a pyrolysis product. The pyrolysis product was injected to a chromatographic column and eluted. The pyrolysis product produced a gas chromatographic spectral peak with a retention time around 13.5 minutes. The response of the GC detector unit to was around 60%. This is indicated as the higher peak in the middle of the timeline in FIG. 9, corresponding to a retention time with a peak maximum at a time point around 13 and half minutes.

FIG. 10 represents a pyrolysis GC chromatogram of a second sample from cured rubber based component of a pneumatic tyre comprising lignin after acetone extraction treatment, as described above. The sample was a cured rubber based component comprising 46 phr of lignin, referring to lignin that had not been treated by hydrothermal carbonization, and corresponded to the sample CMP1 of the FTIR analysis. The sample was prepared as disclosed above and the pyrolysis product was injected to a chromatographic column and eluted. The pyrolysis product produced a gas chromatographic spectral peak with a retention time around 13.5 minutes. This is indicated as the higher peak in the middle of the timeline in FIG. 10, corresponding to a retention time with a peak maximum at a time point around 13 and half minutes. The response of the GC detector unit to was around 20%. The ratio of the spectral peak height of the first sample containing HTC lignin to the spectral peak height of the second sample containing lignin that had not been treated by hydrothermal carbonization was in the range of 3:1. The cured rubber based component comprising lignin thus produced a significantly lower response of the GC detector unit. The difference is visually detectable, when comparing the spectral peak heights of FIGS. 9 and 10.

FIG. 11 represents a pyrolysis GC chromatogram of a third sample from cured rubber based component of a pneumatic tyre after acetone extraction treatment, as described above, which sample did not comprise lignin. The sample was a cured rubber based component comprising 46 phr of N660 grade carbon black, and corresponded to the reference sample CMP3 of the FTIR analysis. The sample was prepared as disclosed above and the pyrolysis product was injected to a chromatographic column and eluted. The pyrolysis product did not produce a gas chromatographic spectral peak with a retention time around 13.5 minutes. The GC detector unit had an essentially flat baseline level below 10%.

The results demonstrate that gas chromatography may be used to detect the presence of the HTC lignin from a pyrolysis product of a cured rubber based component of a pneumatic tyre. HTC lignin produces an eluted fragment with a retention time around 13.5 minutes. The eluted fragment is not present in cured rubber based component of a pneumatic tyre comprising only carbon black.

Figure 12:
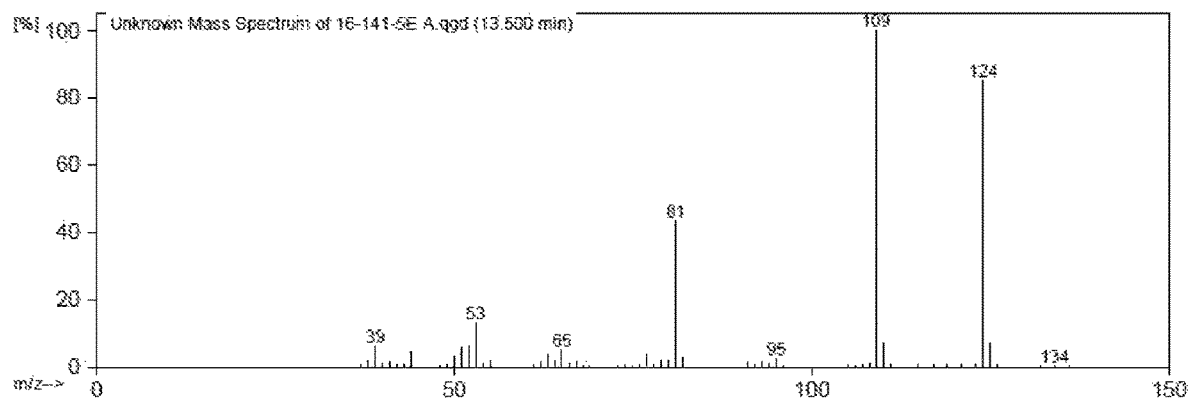
FIGS. 12 and 13 together represent, by way of an example, mass spectrometry correlation data, proving that the spectral peak having a retention time around 13.5 minutes corresponds to 2-methoxyphenol.
Figure 13:
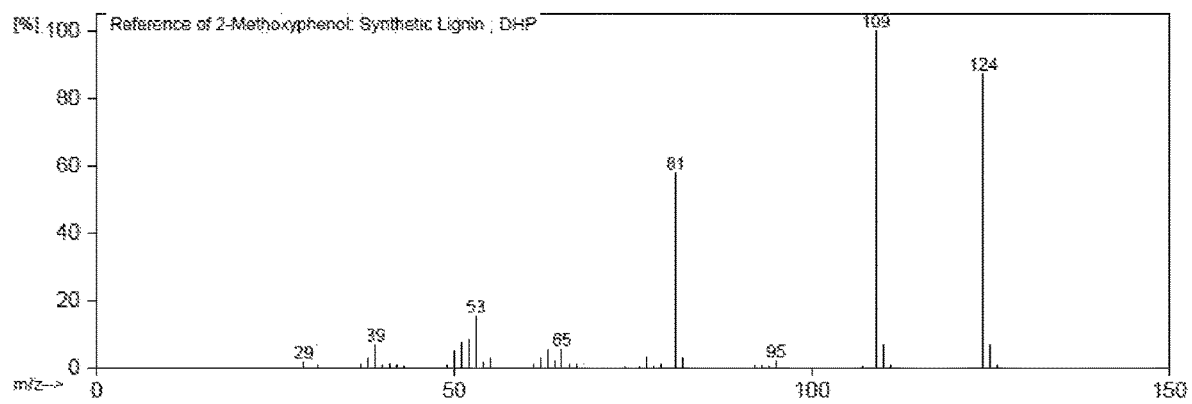

Referring to FIGS. 12 and 13. The eluted fragment with a retention time around 13.5 minutes from the sample containing HTC lignin was analyzed with a mass spectrometer downstream of the gas chromatography. The vertical axis represents the intensity (%). The horizontal axis represents the mass-to-charge (m/z). FIG. 12 represents the mass spectrum of the eluted fragment with a retention time around 13.5 minutes from a pyrolysis product of a cured rubber based component of a pneumatic tyre comprising HTC lignin. FIG. 13 represents the mass spectrum of 2-methoxyphenol. The mass spectrum of the eluted fragment with a retention time around 13.5 minutes from a pyrolysis product of a cured rubber based component of a pneumatic tyre comprising HTC lignin matches with the mass spectrum of 2-methoxyphenol.

As demonstrated above, the presence of HTC lignin which contains 2-methoxyphenol may be determined from a rubber based component of a pneumatic tyre by means pyro-GC-MS analysis.

Detection of HTC Lignin from a Rubber Based Component of a Pneumatic Tyre by Thermogravimetric Analysis Presence of HTC lignin in a rubber based component of a pneumatic tyre may be determined by means of thermogravimetric analysis, abbreviated as TGA. HTC lignin begins to combust in lower temperatures than carbon black which is conventionally used in rubber based compounds of a pneumatic tyre. When performing a thermogravimetric analysis on a cured rubber based component, such as vulcanized rubber product, the component is first treated by acetone, as described above.

A cured rubber based component comprising HTC lignin may under combustible conditions produce a first derivative curve peak of the second mass change at a temperature equal to or less than 550° C. A thermogravimetric analysis of the cured rubber based component, after acetone extraction treatment according to standard D297-93 (2006), produces a first derivative curve peak of the second mass change at a temperature equal to or less than 550° C., when the cured rubber based component is subjected to a thermogravimetric analysis in a temperature range between 20° C. and 800° C. at a heating rate of 10° C./minute according to standard ASTM D6370-09. The first derivative TGA curve peak of the first mass change may be, for example, in a temperature in the range of 440 to 550° C. In comparison, a cured rubber based component comprising only carbon black typically has a first derivative TGA curve peak of the first mass change at a higher temperature than a cured rubber based component comprising HTC lignin.

The amount of organics content in rubber based compound comprising HTC lignin may be higher than the amount of organics content in rubber based compound comprising only conventional fillers, such as carbon black and/or silica. The amount of residual mass, principally ash, remaining after the thermogravimetric analysis, may be higher in a cured rubber based components comprising HTC lignin than in conventional components comprising only carbon black. The residual matter of a cured rubber based component comprising HTC lignin may be, for example, in the range of 2.5% to 10% by weight of the cured rubber based component.

Figure 14:
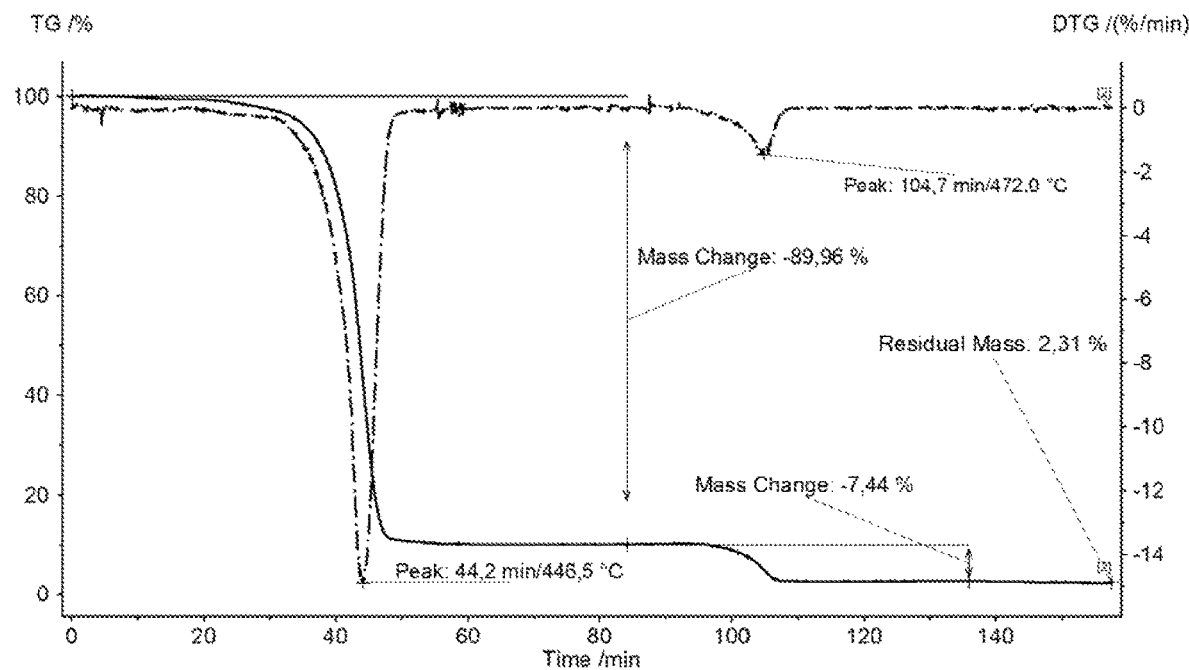
FIGS. 14 to 16 each represents, by way of an example, a thermogravimetric curve and a differential thermogravimetric curve, measured from a cured rubber based component as a function of time.
Figure 15:
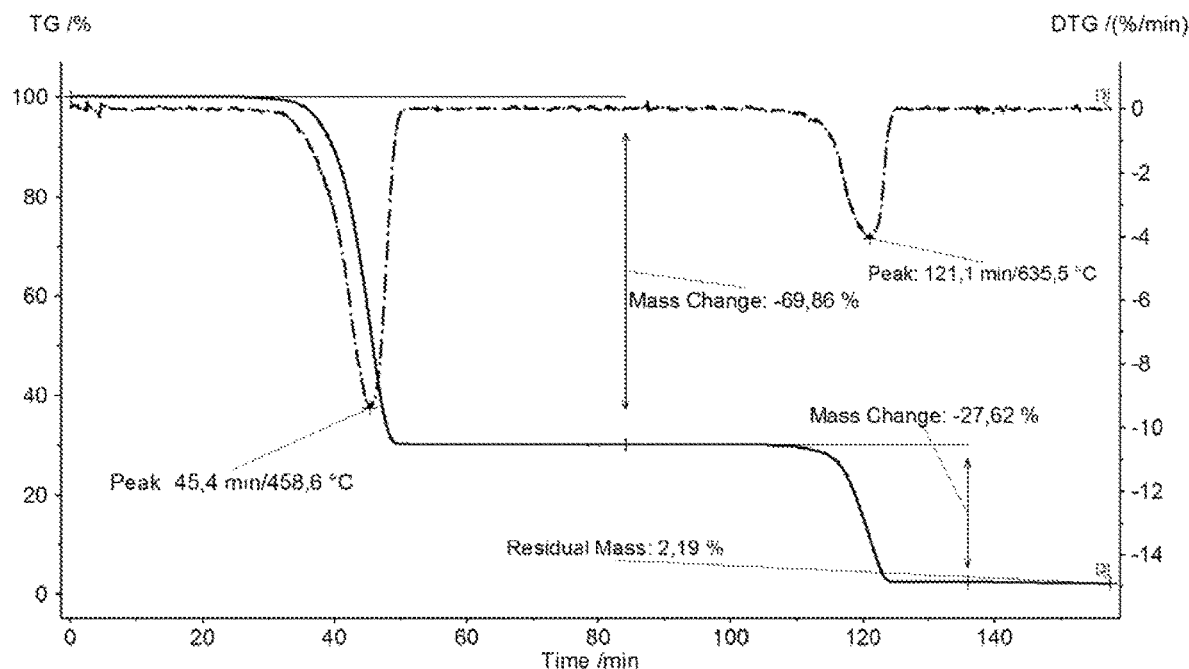
Figure 16:
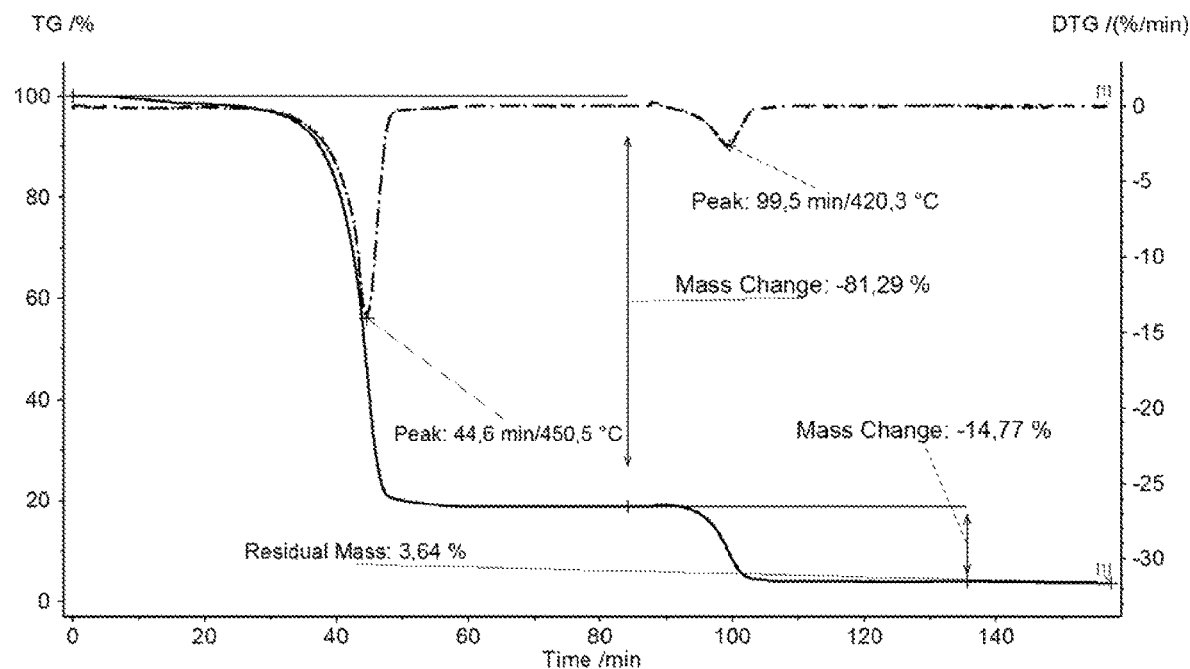
Figure 17:
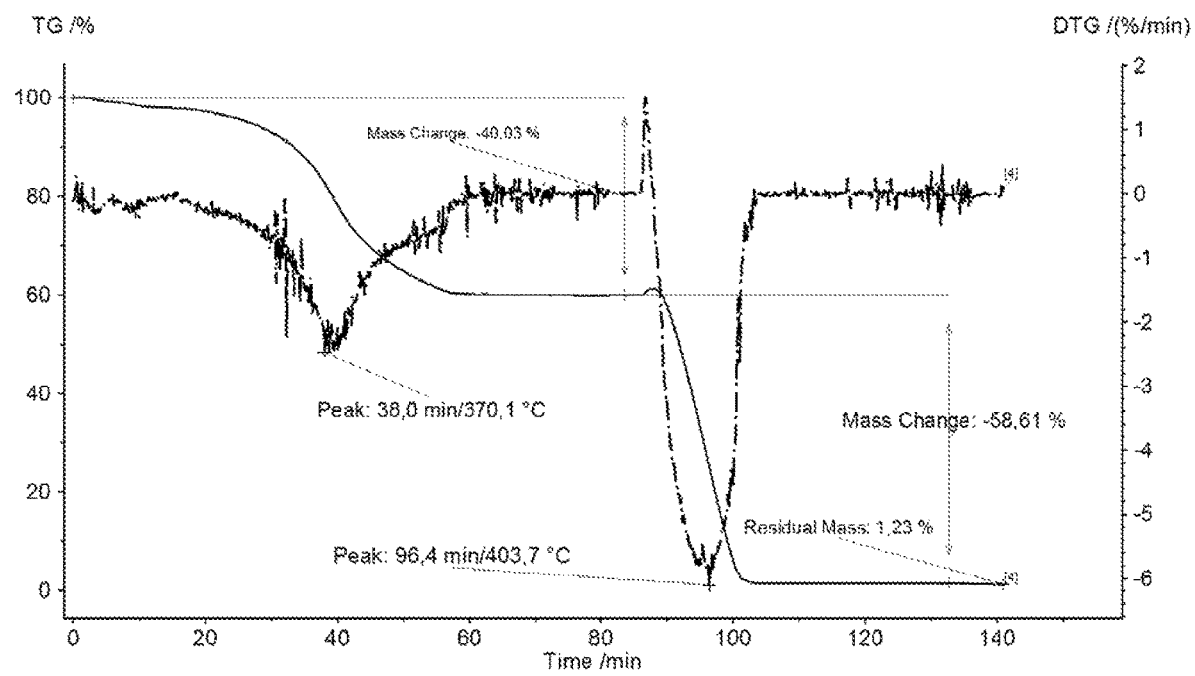
FIG. 17 represents, by way of an example, a thermogravimetric curve and a differential thermogravimetric curve, measured from a sample of HTC lignin as a function of time.

Referring to FIGS. 14, 15, 16 and 17. TGA may be used to measure the amount and rate of change in the mass of a sample as a function of temperature or time in a controlled atmosphere. FIGS. 14, 15 and 16 are TGA results illustrating the mass change of a rubber based component after acetone extraction treatment as described above, when the rubber based component was heated at a constant rate of 10° C. per minute, over a temperature range from 20° C. to 800° C., according to standard ASTM D6370-09. The instrument used was Netzsch TG 209 F1 Libra, with Proteus software. FIG. 17 is a TGA result illustrating the mass change of HTC lignin, when analyzed in the same manner. The atmosphere profile in each analysis was $N_2/O_2/N_2/N_2$. The crucible in each analysis was of aluminum oxide ($Al_2O_3$). The vertical axis on the left side of each diagram represents the mass change in percentages (TG/%). The vertical axis on the right side of each diagram represents the differential mass change (DTG/(%/min)). The horizontal axis of each diagram represents the time in minutes. The continuous line in each diagram is a thermogravimetric curve, illustrating the sample mass versus time. The dashed line in each diagram is the differential thermogravimetric curve, referred to also as the first derivative TGA curve, illustrating the rate of sample mass loss versus time. The first mass change in each diagram, between time period ranging from 0 to 85 minutes, represents the organics content of the sample remaining after the acetone extraction treatment. The second mass change in each diagram, between time period ranging from 85 to 138 minutes, represents the combustion of carbon black with oxygen. The residual mass in each diagram represents the ash content of the sample, wherein the ash content may comprise for example zinc oxide and/or silica. Around 90 minutes time point, when the atmosphere of the TGA contains oxygen, minor increases in sample mass may be detected due to oxidation reactions in the samples. Such increases in sample mass typically indicate the presence of metals which may be oxidized.

FIG. 14 discloses TGA results of a sample of cured rubber based component comprising 46 phr of lignin that had not been treated by hydrothermal carbonization and corresponded to the reference sample CMP1 of the FTIR analysis. The initial sample mass was approximately 14.5 milligrams, referring to the mass at the beginning of the TGA analysis. The TGA results show that the sample containing lignin undergoes a first mass change, wherein 89.96% of the sample mass is lost. The sample containing lignin has a first derivative TGA curve peak of the first mass change at a time point of 44.2 minutes, at a temperature of 446.5° C. The TGA results further show that the sample containing lignin then undergoes a second mass change under atmosphere containing oxygen, wherein 7.44% of the sample mass is lost. The sample containing lignin has a first derivative TGA curve peak of the second mass change at a time point of 104.7 minutes, at a temperature of 472.0° C. The sample containing lignin has a residual mass of 2.31%.

FIG. 15 discloses TGA results of a sample of cured rubber based component comprising 46 phr of N660 grade carbon black, and corresponded to the reference sample CMP3 of the FTIR analysis. The initial sample mass was approximately 14.4 milligrams, referring to the mass at the beginning of the TGA analysis. The TGA results show that the sample containing carbon black undergoes a first mass change, wherein 69.96% of the sample mass is lost. The sample containing carbon black has a first derivative TGA curve peak of the first mass change at a time point of 45.4 minutes, at a temperature of 458.6° C. The TGA results further show that the sample containing carbon black then undergoes a second mass change under atmosphere containing oxygen, wherein 27.62% of the sample mass is lost. The sample containing carbon black has a first derivative TGA curve peak of the second mass change at a time point of 121.1 minutes, at a temperature of 635.5° C. The sample containing carbon black has a residual mass of 2.19%.

FIG. 16 discloses TGA results of a sample of cured rubber based component comprising 46 phr of HTC lignin, referring to lignin that had been treated by hydrothermal carbonization, and corresponded to the sample CMP2 of the FTIR analysis. The initial sample mass was approximately 14.5 milligrams, referring to the mass at the beginning of the TGA analysis. The TGA results show that the sample containing HTC lignin undergoes a first mass change, wherein 81.29% of the sample mass is lost. The sample containing HTC lignin has a first derivative TGA curve peak of the first mass change at a time point of 44.6 minutes, at a temperature of 450.5° C. The TGA results further show that the sample containing HTC lignin then undergoes a second mass change under atmosphere containing oxygen, wherein 14.77% of the sample mass is lost. The sample containing HTC lignin has a first derivative TGA curve peak of the second mass change at a time point of 99.5 minutes, at a temperature of 420.3° C. The sample containing HTC lignin has a residual mass of 3.64%.

FIG. 17 discloses TGA results of a sample of HTC lignin, referring to lignin that had been treated by hydrothermal carbonization, which may be mixed with a rubber to manufacture a rubber based component for a pneumatic tyre. The initial sample mass was approximately 11.7 milligrams, referring to the mass at the beginning of the analysis. The TGA results show that the sample containing HTC lignin undergoes a first mass change, wherein 40.03% of the sample mass is lost. The sample containing HTC lignin has a first derivative TGA curve peak of the first mass change at a time point of 38.0 minutes, at a temperature of 370.1° C. The TGA results further show that the sample containing HTC lignin then undergoes a second mass change under atmosphere containing oxygen, wherein 58.61% of the sample mass is lost. The sample containing HTC lignin has a first derivative TGA curve peak of the second mass change at a time point of 96.4 minutes, at a temperature of 403.7° C. The sample containing HTC lignin has a residual mass of 1.23%.

A Method for Determining the Specific Surface Area of HTC Lignin from a Cured Rubber Based Component of a Pneumatic Tyre The specific surface area may be determined according to ASTM D6556-10, the specific surface area referring to the total surface area based on multipoint nitrogen adsorption, denoted as NSA. The NSA is based on the B.E.T theory, which includes the total surface area, inclusive of micropores with pore diameters less than 2 nm (20 Å). Specific surface area based on multipoint nitrogen adsorption is widely used for determining the total and external surface area of carbon black and carbon black type material. HTC lignin in this context refers to carbon black type material.

In general, HTC lignin suitable for a rubber based component of a pneumatic tyre may have a specific surface area of less than 150 $m^2/g$, when measured according to ASTM D-6556-10 from material which has not been mixed with rubber, referred to as virgin material.

The specific surface area of HTC lignin suitable for a rubber based component of a pneumatic tyre is different, when measured from a cured rubber based component of a pneumatic tyre. The specific surface area of HTC lignin may be measured from a sample of cured rubber based component according to the same standard (ASTM D6556-10). The method for determining the specific surface area of HTC lignin comprises separating the filler material comprising carbon black and/or HTC lignin from the cured rubber based component. Rapra Review Reports (Rubber Analysis: Polymers, Compounds and Products, Volume 12, Number 7, 2001 p. 22) discloses a method suitable for separation of carbon black type material from a cured rubber based component. A pyrolysed HTC lignin in this context refers to carbon black type material. The method disclosed in the literature is modified in that the pyrolysis of the sample is performed at 600° C., thereby converting the sample to a pyrolysis product. The specific surface area is measured from the separated carbon black type material of the pyrolysis product according to the same standard (ASTM D6556-10). During pyrolysis at 600° C., the sample comprising HTC lignin may undergo further decomposition of HTC lignin, thereby leading to increased specific surface area of the sample. The specific surface area of such pyrolysis product is considerably higher than the specific surface area of virgin HTC lignin material, which has not been mixed with rubber.

A cured rubber based component comprising HTC lignin, when pyrolysed at 600° C. may be converted to a pyrolysis product having a specific surface area of equal to or higher than 200 m$^2$/g. The specific surface area of the pyrolysis product may be equal to or higher than 300 m$^2$/g, even equal to or higher than 400 m$^2$/g. The specific surface area of the pyrolysis product may be, for example, in the range of 200 to 400 m$^2$/g, or in the range of 300 to 400 m$^2$/g. Such high specific surface areas are characteristic to cured rubber based component comprising lignin that has been treated by hydrothermal carbonization. The increase of surface area has not been observed when pyrolysing samples containing only carbon black, which makes this a distinguishing feature of cured rubber based component comprising HTC lignin.

The cured rubber based component of a pneumatic tyre comprising HTC lignin, when pyrolysed at 600° C., may thus be converted to a pyrolysis product, wherein the carbon black type filler material, once separated from the pyrolysis product, may have a specific surface area of equal to or higher than 200 m$^2$/g, when determined according to ASTM D6556-10, the specific surface area referring to the total surface area based on multipoint nitrogen adsorption, the carbon black type filler material referring to carbon black and/or HTC lignin.

Rolling Resistance of a Pneumatic Tyre Comprising HTC Lignin

A rubber based component has both elastic and viscous qualities. Rolling resistance of a tyre is typically characterized by tangent delta, abbreviated as tan δ. Tangent delta is a ratio of the loss modulus to the storage modulus. Storage modulus measures the stored energy, representing the elastic portion. Loss modulus measures the energy dissipated as heat, representing the viscous portion. Tangent delta relates to the processability of rubber based component in uncured state. Tangent delta relates to the heat generation, known as hysteresis, of a cured rubber based component of pneumatic tyre. A lower tangent delta value reflects reduced heat generation characteristics of a material.

Tangent delta relates inversely to the resiliency of a cured rubber based component of pneumatic tyre. Components with a higher modulus are more resilient. A resilient material comprises less flexing fatigue. Resiliency of a tyre may be measured by a 300% modulus test, which is a measure of tensile strength at a particular elongation. In other words, the 300% modulus of a tyre is a measure of the stress required to produce 300% elongation in a uniaxial tension test. Tangent delta may be determined by dynamic mechanical analysis, known as DMA. 300% modulus test value may be determined by uniaxial tensile tester. Hereafter, the 300% modulus test value is referred to as the modulus value, unless otherwise stated.

Heat generation and flexing fatigue of a tyre may be measured according to ASTM D623-99. In a dynamic mechanical analysis a sinusoidal force (stress σ) is applied to a material and the resulting displacement (strain) is measured.

A pneumatic tyre comprising cured rubber based component comprising HTC lignin may be configured to have characteristics, which reduce the rolling resistance of the tyre. HTC lignin may be used in a rubber based component of a pneumatic tyre to decrease ratio of loss modulus to storage modulus. Referring to the description of HTC lignin above, HTC lignin may be used in a rubber based component of a pneumatic tyre with or without a coupling agent, such as a silane based coupling agent. HTC lignin may be used in a non-tread area of a rubber based component of a pneumatic tyre, such as a sidewall or bead area component. HTC lignin may be used in a tread area of a rubber based component of a pneumatic tyre.

The tangent delta of a cured rubber based component may be measured with dynamic thermomechanical analyzer, denoted as DTMA, for example at 10 Hz frequency at a temperature in the range of 50° C. to 70° C., preferably in a temperature of 60° C., which is commonly used for prediction of rolling resistance of a tyre.

Effects of HTC lignin to the tangent delta and modulus values of a pneumatic tyre are further illustrated below, by way of examples.

Figure 18:
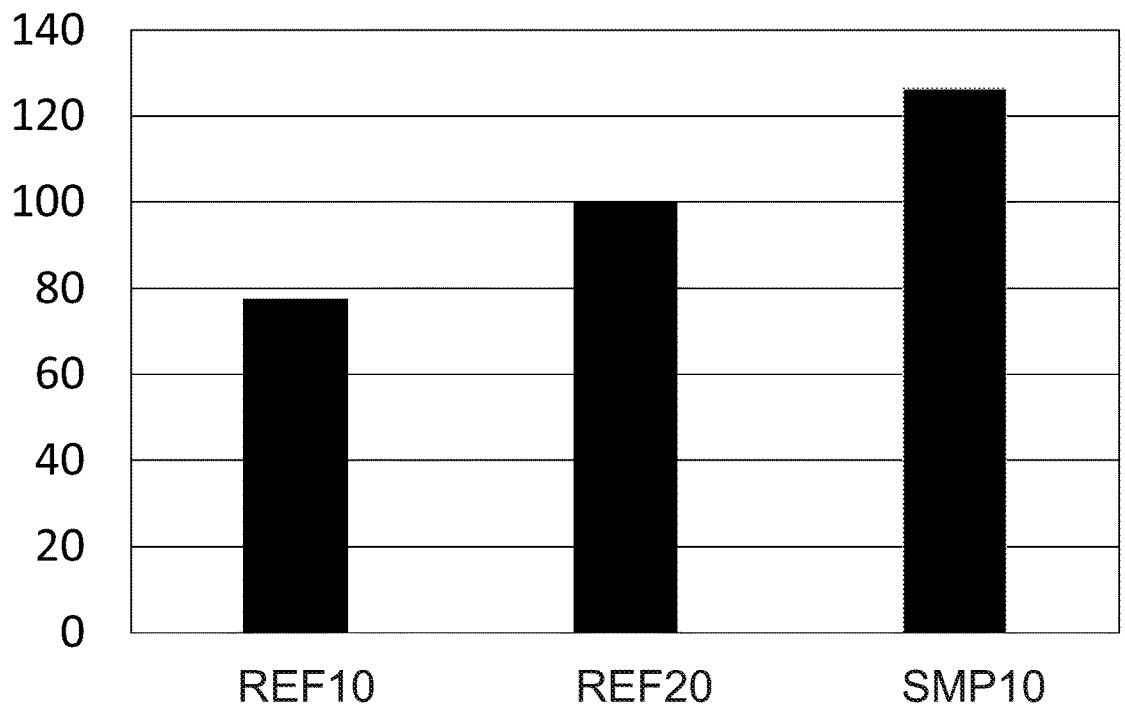
FIG. 18 represents, by way of an example, a comparison of tangent delta values of cured rubber based components.

Referring to FIG. 18. Tangent delta value using DTMA with 10 Hz frequency at 60° C. temperature was determined independently from three pneumatic tyre samples REF10, REF20, SMP10, each sample representing a non-tread area component, all samples having identical dimensions. The sample SMP10 represented a cured rubber based component of a pneumatic tyre comprising HTC lignin without a coupling agent. The amount of HTC lignin in the cured rubber based component of a pneumatic tyre was 46 phr. The first reference sample REF10 represented a cured rubber based component of a pneumatic tyre comprising carbon black. The amount of carbon black in the cured rubber based component of a pneumatic tyre was 46 phr. The carbon black was of N660 grade, having a specific surface area in the range of 30 to 40 m$^2$/g. The second reference sample REF20 represented a cured rubber based component of a pneumatic tyre comprising silica and a silane based coupling agent. The vertical axis in FIG. 18 represents relative value of tangent delta (tan δ) in each sample. The values are relative to the reference sample REF20, which has been given an index value of 100. A relative value higher than 100, in this context, represents a decrease in tangent delta (tan δ) value. Therefore, a higher relative value corresponds with a lower tangent delta value. A lower tangent delta value in turn corresponds with a lower rolling resistance. Sample SMP10 comprising HTC lignin has a relative value of 126. Reference sample REF10 comprising carbon black has a relative value of 77. Sample SMP10 comprising HTC lignin therefore has a 26% lower tangent delta value than reference sample REF20 comprising silica. Sample SMP10 comprising HTC lignin has a 64% lower tangent delta value than reference sample REF20 comprising carbon black.

Figure 19:
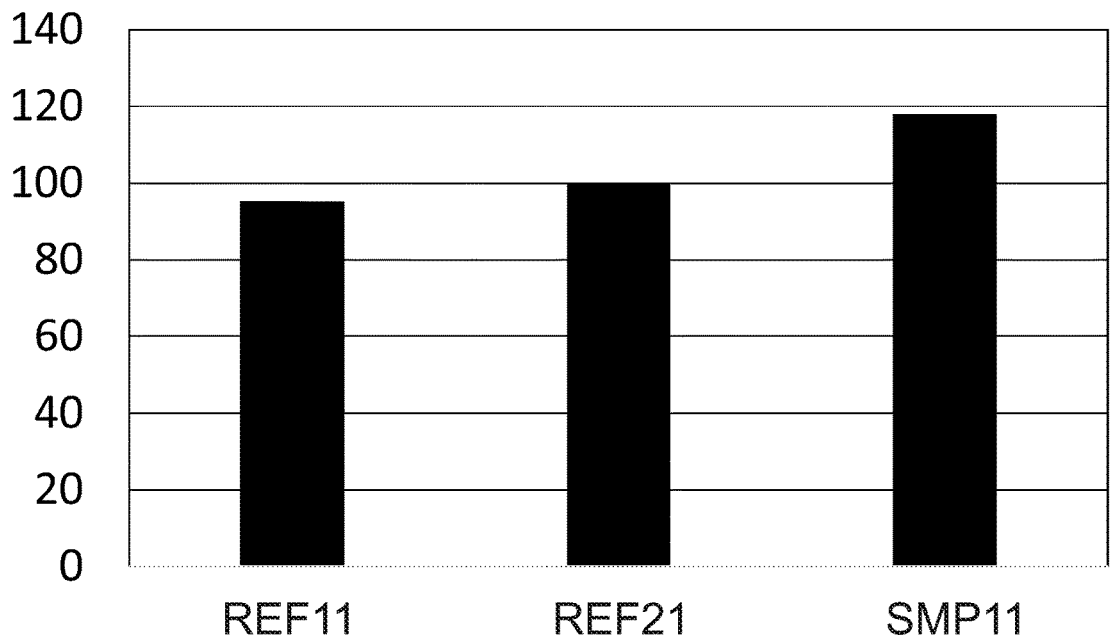
FIG. 19 represents, by way of an example, another comparison of tangent delta values of cured rubber based components.

Referring to FIG. 19. Tangent delta value using DTMA with 10 Hz frequency at 60° C. temperature was determined independently from three pneumatic tyre samples REF11, REF21, SMP11, each sample representing a non-tread area component, all samples having identical dimensions. The sample SMP11 represented a cured rubber based component of a pneumatic tyre comprising HTC lignin and a silane based coupling agent. The amount of HTC lignin in the cured rubber based component of a pneumatic tyre was 46 phr. The reference sample REF11 represented a cured rubber based component of a pneumatic tyre comprising 46 phr of carbon black. The carbon black was of N660 grade, having a specific surface area in the range of 30 to 40 m$^2$/g. The reference sample REF21 represented a cured rubber based component of a pneumatic tyre comprising silica and a silane based coupling agent. The vertical axis in FIG. 19 represents the relative value of tangent delta (tan δ) in each sample. The values are relative to the reference sample REF21, which has been given an index value of 100, as above. Sample SMP11 comprising HTC lignin has a relative value of 118. Reference sample REF11 comprising carbon black has a relative value of 95. Sample SMP11 comprising HTC lignin and a silane based coupling agent has a 18% lower tangent delta value than reference sample REF21 comprising silica and a silane based coupling agent. Sample SMP11 comprising HTC lignin and a silane based coupling agent has a 24% lower tangent delta value than reference sample REF21 comprising carbon black.

The results demonstrate, that a cured rubber based component of a pneumatic tyre comprising HTC lignin may have a tangent delta value which is lower than the tangent delta value a cured rubber based component of a pneumatic tyre comprising carbon black or silica. The tangent delta value of a cured rubber based component of a pneumatic tyre comprising HTC lignin may be equal to or less than 18% of the tangent delta value of a cured rubber based component of a pneumatic tyre comprising silica and/or carbon black. The tangent delta value a cured rubber based component of a pneumatic tyre comprising HTC lignin may be equal to or less than 25% of the tangent delta value of a cured rubber based component of a pneumatic tyre comprising silica and/or carbon black. The tangent delta value of a cured rubber based component of a pneumatic tyre comprising HTC lignin may be up to 64% lower than the tangent delta value of a cured rubber based component of a pneumatic tyre comprising silica and/or carbon black.

The tangent delta of a cured rubber based component of a pneumatic tyre comprising HTC lignin may be denoted as tan $\delta_{HTC1}$. The tangent delta of a cured rubber based component of a pneumatic tyre comprising HTC lignin and a silane based coupling agent may be denoted as tan $\delta_{HTC2}$. The tangent delta of a cured rubber based component of a pneumatic tyre comprising carbon black may be denoted as tan $\delta_{CB}$. The tangent delta of a cured rubber based component of a pneumatic tyre comprising silica may be denoted as tan $\delta_{SI}$.

According to an embodiment, tan $\delta_{HTC1}$ may be at least 5% lower than tan $\delta_{CB}$. The tan $\delta_{HTC1}$ may be at least 10% lower than tan $\delta_{CB}$, such as at least 20% lower than tan $\delta_{CB}$. The ratio tan $\delta_{HTC1}$/tan $\delta_{CB}$ may be, for example, in the range of 0.95 to 0.6.

According to an embodiment, tan $\delta_{HTC2}$ may be at least 5% lower than tan $\delta_{CB}$. The tan $\delta_{HTC2}$ may be at least 10% lower than tan $\delta_{CB}$, such as at least 20% lower than tan $\delta_{CB}$. The ratio tan $\delta_{HTC2}$/tan $\delta_{CB}$ may be, for example, in the range of 0.95 to 0.8.

Figure 20:
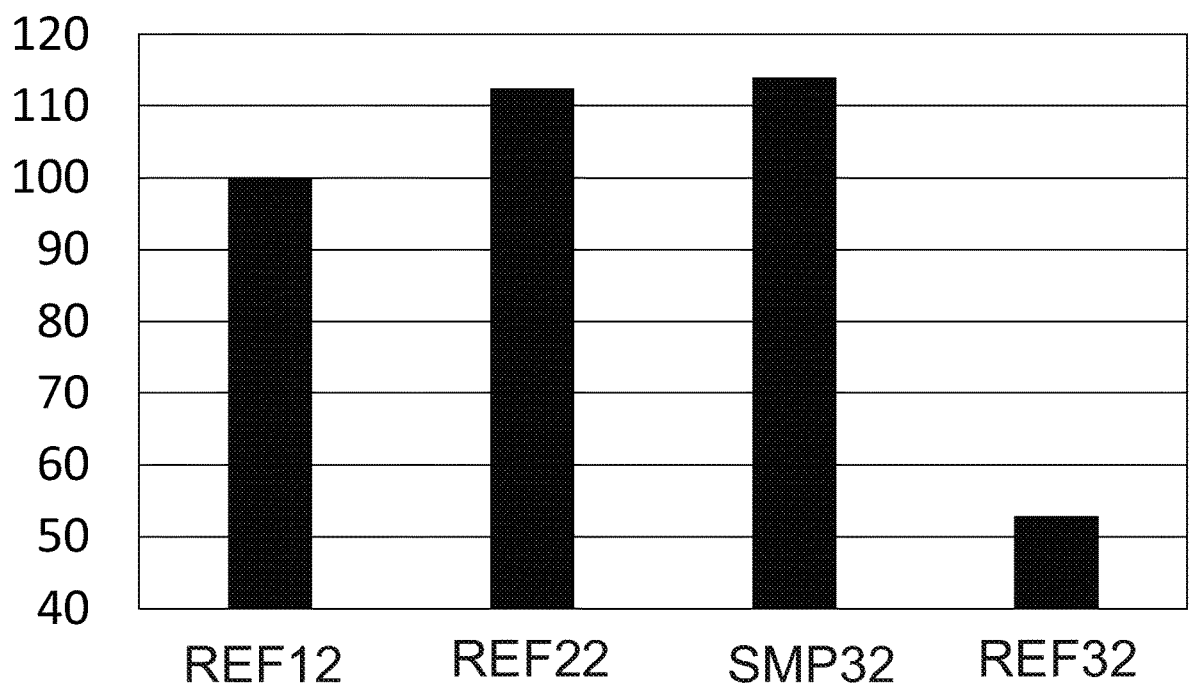
FIG. 20 represents, by way of an example, a comparison of modulus 300% values of cured rubber based components.

Referring to FIG. 20. The tensile strength required to produce a 300% elongation was measured by the 300% modulus test. The modulus value, referring to the value of the 300% modulus test, was determined with uniaxial tensile tester independently of four pneumatic tyre samples REF12, REF22, SMP32, REF32, each sample representing a non-tread area component, all samples having identical dimensions. The sample SMP32 represented a cured rubber based component of a pneumatic tyre comprising 46 phr of HTC lignin. The cured rubber based component of a pneumatic tyre comprised HTC lignin and a silane based coupling agent. The reference sample REF12 represented a cured rubber based component of a pneumatic tyre comprising 46 phr of carbon black. The carbon black was of N660 grade, having a specific surface area in the range of 30 to 40 m²/g. The reference sample REF22 represented a cured rubber based component of a pneumatic tyre comprising silica and a silane based coupling agent. The reference sample REF32 represented a cured rubber based component of a pneumatic tyre comprising 46 phr of lignin and a silane based coupling agent, wherein the lignin had not been treated by hydrothermal carbonization. The vertical axis in FIG. 20 represents the relative modulus value, which refers to the relative tensile strength required to produce a 300% elongation in a sample. A relative modulus value higher than 100, in this context, represents a higher tensile strength required to produce a 300% elongation in a sample. A higher tensile strength in turn corresponds with increased resiliency. The values are relative to the reference sample REF12 comprising carbon black, which has been given an index value of 100. The reference sample REF22 comprising silica has a relative value of 112. Sample SMP32 comprising HTC lignin has a relative value of 114. The reference sample REF32 comprising lignin had not been treated by hydrothermal carbonization has a relative value of 53. Sample SMP32 comprising HTC lignin and a silane based coupling agent has a 14% higher modulus 300% value than reference sample REF12 comprising carbon black. Sample SMP32 comprising HTC lignin and a silane based coupling agent has a 2% higher modulus 300% value than reference sample REF22 comprising silica and a silane based coupling agent. Sample SMP32 comprising HTC lignin and a silane based coupling agent has a 216% higher modulus 300% value than reference sample REF32 comprising lignin and a silane based coupling agent, wherein the lignin had not been treated by hydrothermal carbonization.

The results demonstrate, that a cured rubber based component of a pneumatic tyre comprising HTC lignin may have a modulus value which is higher than the modulus value of a cured rubber based component of a pneumatic tyre comprising carbon black or silica. The modulus value a cured rubber based component of a pneumatic tyre comprising HTC lignin and a silane based coupling agent may be equal to or higher than the modulus value of a cured rubber based component of a pneumatic tyre comprising silica. The modulus value a cured rubber based component of a pneumatic tyre comprising HTC lignin and a silane based coupling agent may be equal to or higher than 14% of the modulus value of a cured rubber based component of a pneumatic tyre comprising carbon black. The modulus value a cured rubber based component of a pneumatic tyre comprising HTC lignin and a silane based coupling agent may be equal to or more than 200% of the modulus value of a cured rubber based component of a pneumatic tyre comprising lignin and a silane based coupling agent, wherein the lignin has not been treated by hydrothermal carbonization.

The modulus value of a cured rubber based component of a pneumatic tyre comprising HTC lignin and a silane based coupling agent may be denoted may be denoted as $MOD_{HTC2}$. The modulus value of a cured rubber based component of a pneumatic tyre comprising carbon black may be denoted as $MOD_{CB}$. The modulus value of a cured rubber based component of a pneumatic tyre comprising silica may be denoted as $MOD_{SI}$. The modulus value of a cured rubber based component of a pneumatic tyre comprising lignin and a silane based coupling agent, wherein the lignin has not been treated by hydrothermal carbonization may be denoted as $MOD_{LIG}$.

According to an embodiment, $MOD_{HTC2}$ may be at least 5% higher than $MOD_{CB}$. The $MOD_{HTC2}$ may be at least 10% higher than $MOD_{CB}$, such as at least 14% higher than $MOD_{CB}$. The ratio $MOD_{HTC2}/MOD_{CB}$ may be, for example, in the range of 1.05 to 1.14 or higher.

According to an embodiment, $MOD_{HTC2}$ may be equal to or higher than $MOD_{SI}$. The $MOD_{HTC2}$ may be at least 2% higher than $MOD_{SI}$. The ratio $MOD_{HTC2}/MOD_{SI}$ may be, for example, in the range of 1.00 to 1.02 or higher.

According to an embodiment, $MOD_{HTC2}$ may be at least 100% higher than $MOD_{LIG}$. The $MOD_{HTC2}$ may be at least 200% higher than $MOD_{CB}$, such as at least 216% higher than $MOD_{CB}$. The ratio $MOD_{HTC2}/MOD_{CB}$ may be, for example, in the range of 1.50 to 2.16 or higher.

The results demonstrate that when carbon black is replaced by HTC lignin in a non-tread area component of a pneumatic tyre, such as sidewall or bead area component, the rolling resistance of the pneumatic tyre may decrease. The results further demonstrate that when silica is replaced by HTC lignin in a non-tread area component of a pneumatic tyre, such as sidewall or bead area component, the rolling resistance of the pneumatic tyre may decrease. The results demonstrate that use of HTC lignin may reduce the rolling resistance of a pneumatic tyre, when used with a silane based coupling agent. The results demonstrate that use of HTC lignin may reduce the rolling resistance of a pneumatic tyre even more, when used without a coupling agent. The amount of carbon black replaced by HTC lignin may be, for example equal to or higher than 75 wt. %, such as in the range of 1 to 70 wt. %, preferably in the range of 20 to 60 wt. %, and most preferably in the range of 30 to 50 wt. % of the weight of the carbon black.

The above-listed examples and embodiments illustrate non-limiting examples. The amounts of HTC lignin disclosed in the above-listed examples may be varied. HTC lignin amounts in a rubber based component of a pneumatic tyre A rubber based component of a pneumatic tyre may comprise HTC lignin, for example, in an amount equal to or less than 46 phr. A rubber based component of a pneumatic tyre may comprise HTC lignin, for example, in an amount equal to or higher than 46 phr.

Experimental Study of HTC Lignin Effects to Performance Characteristics of a Pneumatic Tyre In a comparative experimental study tread area and non-tread area components of a pneumatic tyre, as well as simplified model components were produced and tested in laboratory conditions to determine effects produced by HTC lignin to performance characteristics of a pneumatic tyre. The produced components consisted of reference samples (without HTC lignin), as well as samples which contained various amounts of HTC lignin.

The tread area and non-tread area components were rubber based components which contained polymers and filler compounds, which were mixed together and cured with the aid of elevated temperature and curing chemicals.

Materials and Method in the Experimental Study

Silica having specific surface area 160 $m^2/g$ (BET) and carbon black (N660, rubber-grade) used when preparing the rubber mixtures were of commercial grade.

The lignin used when preparing the rubber mixtures was obtained from Kraft pulp cooking liquor. The lignin, when dried, represented non-HTC lignin in the experimental study and was determined to have a specific surface area of 3.5 $m^2/g$ (BET).

Hydrothermal carbonization treatment was performed to a portion of the obtained lignin (prior to drying), as disclosed above. The formed HTC lignin properties were determined with respect to specific surface area, oil absorption number and trace element content (Table 1).

TABLE 1

Properties of HTC lignin used in the experimental study.

| Property | Value |
|---|---|
| Specific surface area (BET) | 22 $m^2/g$ |
| Oil absorption number | 97 ml/100 g |
| Trace element | Na 0.505%, S 0.626%, K 0.004%, Ca 0.270% |

Rubber mixtures containing technically specified natural rubber (NR), high-cis butadiene rubber (BR) and/or solution styrene-butadiene rubber (SSBR) were prepared to represent tread area components (containing silica) and non-tread area components (without silica). A further, simplified rubber mixture based on SSBR was prepared to represent a model component. The differences between the mixtures, with respect to the polymer and filler compounds, are shown below (Table 2).

TABLE 2

Polymer and filler compound types used in the rubber mixtures

|  | tread | non-tread | model |
|---|---|---|---|
| polymers | SSBR/BR/NR (80:10:10) | NR/BR (50:50) | SSBR (100) |
| filler | N660 and silica | N660 | N660 |

The rubber mixtures were obtained by means of a stepwise mixing process. A 2 L-internal mixer (Krupp Elastomertechnik GK 1,5 laboratory mixer) was used to add the compounds. In the first step, the polymers were added and mixed for 20 seconds. In the second step, part of the filler-type material (carbon black/silica/silane/HTC-lignin/non-HTC lignin) was added and mixed for 60 seconds. In the third step, the rest of the filler-type material was added and mixed for 60 seconds. Silica containing mixtures were silanized at 143-148° C. for 2 min (mixtures without HTC lignin/non-HTC lignin) and HTC lignin/non-HTC lignin containing mixtures were silanized at 155-160° C. for 10 min. The final step with curing chemicals was performed at 95° C. for 50 seconds.

The formed rubber components were thereafter vulcanized (150° C., 150 bar). The optimum vulcanization time of t90 (at 150° C.) was determined with a moving die rheometer according to ASTM D5289/1995. A vulcanization time of t90 plus 5 min was used for components used in tensile, tear and DMTA studies, whereas a vulcanization time of t90 plus 7 min was used for components used in cut growth studies. The vulcanized samples were conditioned for 16 hours prior to performing experimental tests.

Three tread area components were prepared (Table 3). The reference sample REF_A1 contained carbon black as filler and did not contain HTC lignin. Sample A2 contained HTC lignin, instead of carbon black. Sample A3 contained non-HTC lignin. All samples REF_A1, A2 and A3 contained equal amounts of silica.

TABLE 3

Prepared tread area components.

|  | REF_A1 | A2 | A3 |
|---|---|---|---|
| SSBR/BR/NR (phr) | 100 | 100 | 100 |
| carbon black (wt. %) | 2.5 | — | — |
| HTC lignin (wt. %) | — | 2.5 | — |

TABLE 3-continued

Prepared tread area components.

|  | REF_A1 | A2 | A3 |
|---|---|---|---|
| non-HTC lignin (wt. %) | — | — | 2.5 |
| silane* (wt. %) | 8.0 | 8.0 | 8.0 |

*wt. % of silica amount

Five non-tread area components were prepared (Table 4). The reference samples REF_B1 and REF_B2 contained carbon black as filler and did not contain HTC lignin. Sample B3 contained both carbon black and HTC lignin. Sample B4 contained both carbon black and non-HTC lignin. Sample B5 contained HTC lignin, but did not contain carbon black. A silane coupling agent was used in samples B3-B5 which contained HTC lignin or non-HTC lignin.

TABLE 4

Prepared non-tread area components.

|  | REF_B1 | REF_B2 | B3 | B4 | B5 |
|---|---|---|---|---|---|
| NR/BR (phr) | 100 | 100 | 100 | 100 | 100 |
| carbon black (wt. %) | 29 | 25 | 21 | 21 | — |
| HTC lignin (wt. %) | — | — | 8 | — | 25 |
| non-HTC lignin (wt. %) | — | — | — | 8 | — |
| silane* (wt. %) | — | — | 7.4 | 7.4 | 7.4 |

*wt. % of HTC lignin/non-HTC lignin amount

Six model components were prepared (Table 5). The reference samples REF_C1 and REF_C2 contained carbon black as filler in increasing amounts. Samples C3 and C5 contained HTC lignin in increasing amounts, respectively. Samples C4 and C6 contained non-HTC lignin in increasing amounts, respectively. A silane coupling agent was used in the samples C3-C6 which contained HTC lignin or non-HTC lignin.

TABLE 5

Prepared model components.

|  | REF_C1 | REF_C2 | C3 | C4 | C5 | C6 |
|---|---|---|---|---|---|---|
| SSBR (phr) | 100 | 100 | 100 | 100 | 100 | 100 |
| carbon black (wt. %) | 12 | 21 | — | — | — | — |
| HTC lignin (wt. %) | — | — | 12 | — | 21 | — |
| non-HTC lignin (wt. %) | — | — | — | 12 | — | 21 |
| silane*(wt. %) | — | — | 7.4 | 7.4 | 7.4 | 7.4 |

*wt. % of HTC lignin/non-HTC lignin amount

Evaluation of the tensile stress-strain properties (ISO 37-1/1994 dumb-bell test piece) and the tear strength (ISO 34-1/1994 method C) was done with a tensiometer at room temperature. The tensile strength at 300% strain represented the modulus at 300% strain (M300). The tear strength is the maximum force required to tear a specified test piece, in continuation of the nick already produced in the test piece completely across the width of the test piece. The tensile and tear test was performed on a sample cut from a cured rubber component to a sheet of 2 mm thickness.

The temperature-dependent visco-elastic properties of the cured rubber components were determined using a Dynamic Mechanical Analyzer (DMA), following ISO 4664-1/2010. The test was performed on a sample cut from a cured rubber component to a sheet having dimensions of 50 mm×6 mm×2 mm. The temperature sweep tests were performed in tension mode, at 3% static strain and 10 Hz frequency.

For determination of the cut growth, aged test samples were prepared and a cut of defined initial length (2 mm) was made into each of the aged test samples from where the cut growth could commence. After providing the initial cut, flexing stress was applied to the sample. Cut growth (equivalent to crack growth) was measured with a De Mattia-type flexing machine following standard ISO 132 (57+0.5 mm stroke travel, 5.0 Hz±0.17 Hz). At predetermined intervals the flexing machine was paused and the increment in the cut length was measured.

Results of the Experimental Study

All tests were carried out with sample amount according to test standard, except tensile test which were carried out with six test pieces.

Pneumatic tyre durability is a performance characteristic that can be represented by modulus at 300% strain and tear strength. A minimum threshold level at a rubber component may be determined, which serves as a quality criteria for use as a tread area component of a pneumatic tyre.

Figure 21:
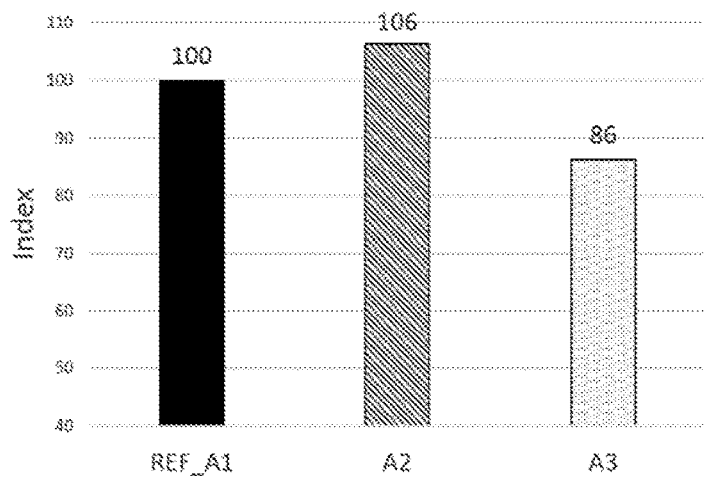
FIG. 21 represents, by way of an example, comparative results of the tensile stress test at 300% strain.

Reference is made to FIG. 21, which demonstrates, by means of an example, comparative results of the tensile stress test at 300% strain. In FIG. 21, the values are relative modulus values at 300% strain in tread area components to the index value of reference sample REF_A1, which has been given an index value of 100. A relative value higher than 100 in the figure represents a higher tensile strength required to produce a 300% elongation in a sample. The reference sample REF_A1 represents a tread area component, which passes the minimum threshold level both for modulus at 300% strain and tear strength values. From FIG. 21 it can be observed that when 2.5 wt. % of HTC lignin A2 was used instead of the same amount of carbon black REF_A1, the 300% modulus was higher. FIG. 21 also demonstrates, that an opposite effect was observed when 2.5 wt. % of non-HTC lignin A3 was used instead. Thus, the use of HTC lignin lead to improved performance characteristic over carbon black, while a replacement with non-HTC lignin did not.

Figure 22:
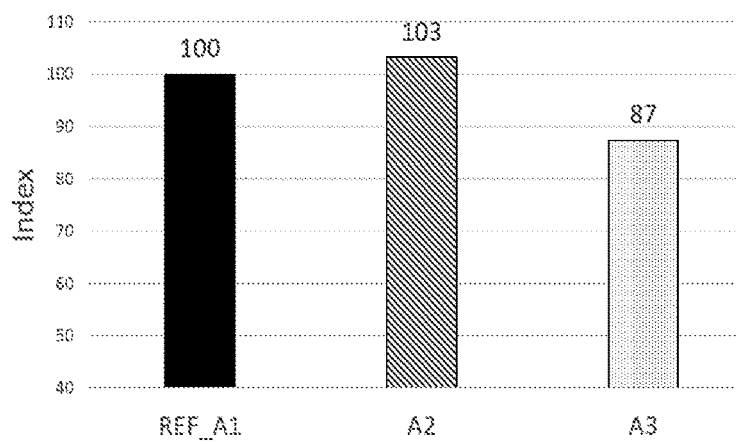
FIG. 22 represents, by way of an example, comparative results of the tear strength test.

Reference is also made to FIG. 22, which demonstrates, by means of an example, comparative results of the tear strength test. In FIG. 21, the values are relative values in tread area components to the tear strength value of reference sample REF_A1, which has been given an index value of 100. A relative value higher than 100 represents a higher tear strength in a sample. From FIG. 22 it can be observed that when 2.5 wt. % of HTC lignin was used in sample A2 instead of the same amount of carbon black sample as in reference sample REF_A1, the relative tear strength was 3% higher. FIG. 22 also demonstrates, that an opposite effect was observed when 2.5 wt. % of non-HTC lignin was used in sample A3. The relative tear strength of the component containing non-HTC lignin in sample A3 was only 87% of the index value of the reference sample REF_A1. Thus, the use of HTC lignin lead to improved performance characteristic over carbon black, whereas the use of non-HTC lignin did not.

Figure 23:
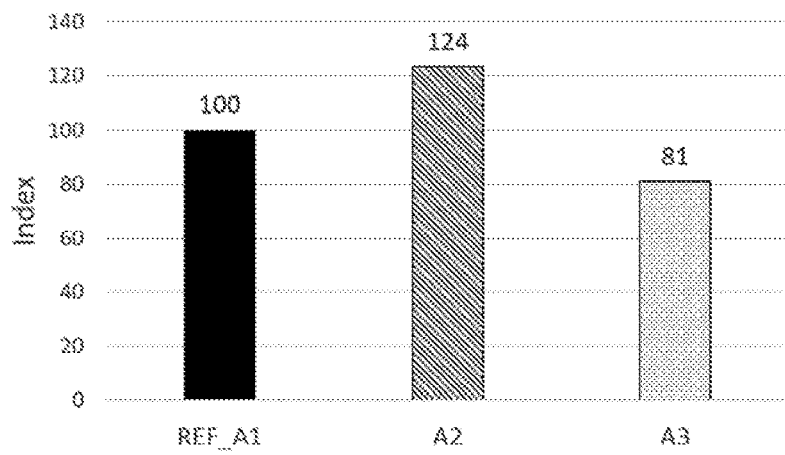
FIG. 23 represents, by way of an example, comparative results of tan δ (60° C.) values determined with DMA from tread area components.
Figure 24:
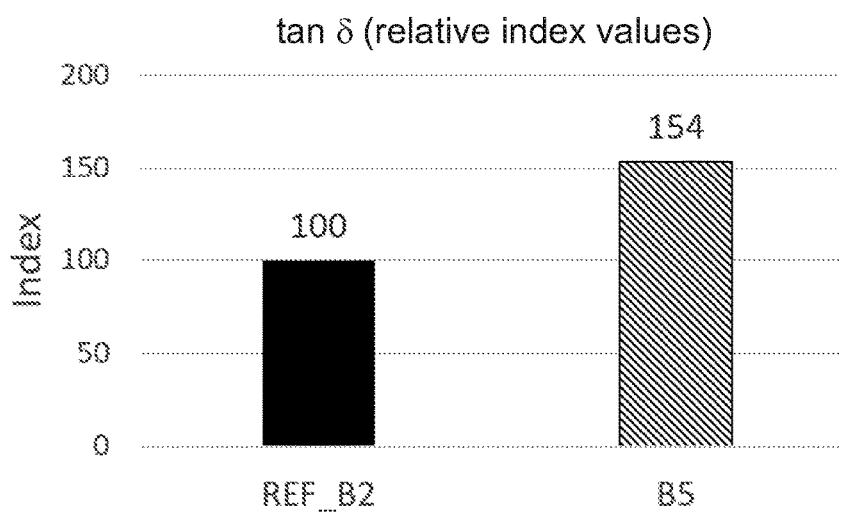
FIG. 24 represents, by way of an example, comparative results of tan δ (60° C.) values determined with DMA from non-tread area components.

Reference is next made to FIGS. 23 and 24 which demonstrate, by means of examples, comparative results of tan δ (60° C.) values determined with DMA from tread area components (FIG. 23) and non-tread area components (FIG. 24), respectively. The vertical axis represents the relative value (tan δ) in each sample. The values are relative to the reference sample REF_A1; REF_B2, which have been given an index value of 100 in each of FIGS. 23 and 24, respectively. A relative value higher than the index value means a decrease in tan δ value and therefore a lower rolling resistance of a pneumatic tyre. Thus, FIG. 23 bars have been drawn such that a relative value higher than 100 represents a decrease in tan δ 60° C. value. From FIG. 23 it can be observed that when 2.5 wt. % of HTC lignin in sample A2 was used instead of the same amount of carbon black in reference sample REF_A1, the relative value was 24% higher, which correlates with a lower rolling resistance. An opposite effect was observed when 2.5 wt. % of non-HTC lignin was used in sample A3. The relative tan δ of the sample A3 containing non-HTC lignin was lower than the index value of the reference sample REF_A1.

The same effect was also observable, when tan δ 60° C. values were determined from non-tread area components with DMA, as shown in FIG. 24. The non-tread area component containing only HTC lignin, i.e. sample B5 had a significantly lower tan δ (60° C.) value, than the reference component containing only carbon black, i.e. sample REF_B2. Thus, the improved performance characteristic of a pneumatic tyre due to HTC lignin was also observable from the non-tread area components. Rolling resistance is a performance characteristic of a pneumatic tyre, which is known to correlate well with tan δ values determined at 60° C.

Figure 25:
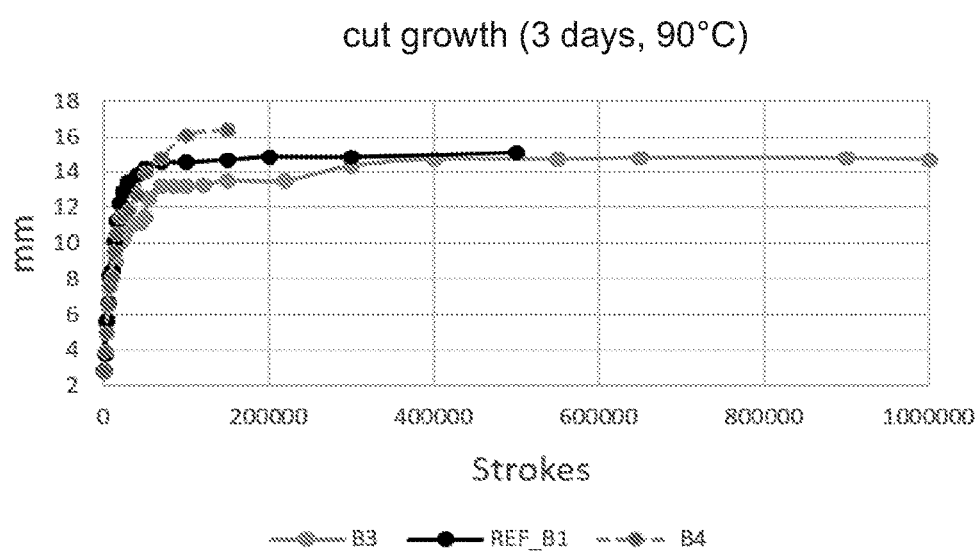
FIG. 25 represents, by way of an example, comparative results of the cut growth test.

Reference is next made to FIG. 25, which demonstrates, by means of an example, comparative results of the cut growth test. Cut growth test is a measure of flexing fatigue, i.e. the ability of a rubber based component to resist cracking, when a component comprising an initial cut is flexed repeatedly. The test simulates fatigue failure, which is an importance performance characteristic of a pneumatic tyre over its lifetime. To simulate the pneumatic tyre lifetime, the samples were aged in an oven at 90° C. for three days. FIG. 25 shows the crack propagation (in millimeters) as a function of strokes (in numbers) in the samples. As can be observed from FIG. 25, the non-HTC lignin sample B4 broke down to two pieces already after 150 000 strokes and the reference sample containing only carbon black REF_B1 broke down to two pieces after 500 000 strokes, whereas the sample containing HTC lignin B3 remained in one piece and did not break down even after 1 000 000 strokes, when the test was stopped.

Figure 26:
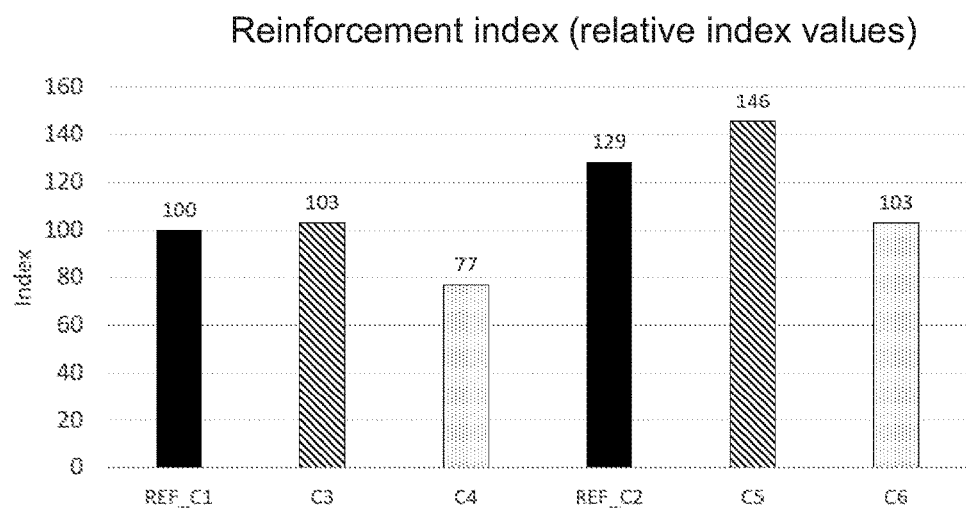
FIG. 26 represents, by way of an example, comparative results of the reinforcement index determination.

Reference is next made to FIG. 26, which demonstrates, by means of an example, comparative results of the reinforcement index determination. Reinforcement index refers to modulus at 300% strain divided by modulus at 100% strain and may also be denoted as M300/M100. A higher reinforcement index value indicates a better reinforcing capability of a rubber based component of a pneumatic tyre. Reinforcement index was measured from six model components based on SSBR, of which samples C3 and C5 comprised different amounts of HTC lignin, samples C4 and C6 comprised different amounts of non-HTC lignin and samples REF_C1 and REF_C2 comprised different amounts of carbon black, as indicated in Table 5 (above).

From FIG. 26 it can be observed that at tested amounts of filler content (12 and 21 wt. %), a model component comprising only HTC lignin, i.e. samples C3 and C5, has a better relative reinforcement index than a model component comprising only carbon black, i.e. samples REF_C1 and REF_C2, respectively. Further, a model component comprising non-HTC lignin, i.e. samples C4 and C6, had a worse relative reinforcement index value than a model component comprising HTC lignin, i.e. samples C3 and C5.

The experimental test results are consistent and demonstrate improved technical effects of HTC lignin to performance characteristics of a pneumatic tyre.

For the person skilled in the art, it will be clear that modifications and variations of the pneumatic tyre and the method according to the present invention are perceivable. The figures are schematic. The figures are meant to be illustrative representations of example embodiments of the invention. In particular, the FIGS. 1-6 are not in any particular scale. The abbreviation wt. % refers to weight percentage, unless otherwise stated. The abbreviation phr refers to parts per hundred rubber, a term widely used in the rubber manufacturing industry.

The particular embodiments described above with reference to the accompanying drawings are illustrative only and not meant to limit the scope of the invention, which is defined by the appended claims.

The invention claimed is:

1. A method for manufacturing a pneumatic tyre for a vehicle, the method comprising
receiving a rubber based component comprising lignin that has been treated by hydrothermal carbonization,
arranging the rubber based component onto a building drum to form a tubular preform,
expanding the tubular preform to form a preform of a pneumatic tyre,
arranging a metal component and a textile component onto the preform of a tyre, thereby manufacturing a preform of a pneumatic tyre comprising the rubber based component comprising lignin that has been treated by hydrothermal carbonization, the metal component and the textile component, and
curing the preform of a pneumatic tyre, thereby bonding the components together by means of curing and thereby receiving the pneumatic tyre for a vehicle, the pneumatic tyre comprising a cured rubber based component.

2. The method for manufacturing a pneumatic tyre of claim 1, wherein the cured rubber based component contains 2-methoxyphenol, the presence of 2-methoxyphenol being determinable by means of Pyrolysis-Gas Chromatography/Mass Spectroscopy analysis from the cured rubber based component, when pyrolysed at 550° C. according to standard ASTM D3452-06.

3. The method for manufacturing a pneumatic tyre according to claim 1, wherein the cured rubber based component, when pyrolysed at 600° C. according to standard ASTM D3677-10, produces a pyrolysis product having an infrared spectrophotometry absorption band with a peak maximum around 1259 cm$^{-1}$.

4. The method for manufacturing a pneumatic tyre according to claim 1, wherein the cured rubber based component, when pyrolysed at 600° C., produces a pyrolysis product having a specific surface area of equal to or higher than 200 m$^2$/g, the specific surface area referring to the total surface area based on multipoint nitrogen adsorption according to ASTM D6556-10 of carbon black type filler material separated from the pyrolysis product.

5. The method for manufacturing a pneumatic tyre according to claim 1, wherein the cured rubber based component, after an acetone extraction treatment according to standard D297-93, produces a first derivative curve peak of the second mass change at a temperature equal to or less than 550° C., when the cured rubber based component is subjected to a thermogravimetric analysis temperature range between 20° C. and 800° C. at a heating rate of 10° C./minute according to standard ASTM D6370-09.

6. The method for manufacturing a pneumatic tyre according to claim 1, wherein the rubber based component comprises lignin that has been treated by hydrothermal carbonization in an amount of equal to or less than 75 wt. % of total weight of the rubber based component.

7. The method for manufacturing a pneumatic tyre according to claim 6, wherein the rubber based component comprises lignin that has been treated by hydrothermal carbonization in an amount in a range of 10 to 70 wt. % of total weight of the rubber based component.

8. The method for manufacturing a pneumatic tyre according to claim 7, wherein the rubber based component comprises lignin that has been treated by hydrothermal carbonization in an amount in a range of 20 to 60 wt. % of total weight of the rubber based component.

9. The method for manufacturing a pneumatic tyre according to claim 1, wherein the rubber based component comprises lignin that has been treated by hydrothermal carbonization in an amount of less than 10 wt. % of total weight of the rubber based component.

10. The method for manufacturing a pneumatic tyre according to claim 9, wherein the rubber based component comprises lignin that has been treated by hydrothermal carbonization in an amount in a range of 0.5 to 9.5 wt. % of total weight of the rubber based component.

11. The method for manufacturing a pneumatic tyre according to claim 10, wherein the rubber based component comprises lignin that has been treated by hydrothermal carbonization in an amount in a range of 2 to 9 wt. % of total weight of the rubber based component.

12. The method for manufacturing a pneumatic tyre according to claim 1, wherein the rubber based component comprises
lignin that has been treated by hydrothermal carbonization and
methylene donor compound.

13. The method for manufacturing a pneumatic tyre according to claim 12, wherein the methylene donor compound is
a polyamine based hardening resin.

14. The method for manufacturing a pneumatic tyre according to claim 13, wherein the methylene donor compound is hexamethylenetetramine or hexa(methocylmethyl)melamine.

15. The method for manufacturing a pneumatic tyre according to claim 1, wherein the rubber based component further comprises a silane based coupling agent, the coupling agent capable of bonding in a chemical reaction with a rubber compound of a tyre.

16. The method for manufacturing a pneumatic tyre according to claim 15, wherein the coupling agent is bis-[3-(triethoxysilyl)-propyl]-tetrasulfide.

17. The method for manufacturing a pneumatic tyre according to claim 15, wherein the coupling agent is capable of bonding in a chemical reaction with a synthetic or natural rubber compound of the tyre.

18. The method for manufacturing a pneumatic tyre according to claim 1, wherein the lignin that has been treated by hydrothermal carbonization comprises lignin of wooden origin.

19. The method for manufacturing a pneumatic tyre according to claim 1, wherein the cured rubber based component is
a non-tread area component or
a tread area component.

20. The method for manufacturing a pneumatic tyre according to claim 19, wherein the tread area component is tread, tread base, undertread or shoulder.

21. A tyre for a vehicle comprising:
a metal component, a textile component, and a cured rubber based component, the components being bonded together by means of curing;
the cured rubber based component comprising lignin that has been treated by hydrothermal carbonization;
wherein the rubber based component that contains lignin that has been treated by hydrothermal carbonization is a tread area component of the tyre.

22. The tyre for a vehicle according to claim 21, wherein amount of lignin that has been treated by hydrothermal carbonization is in a range of 1 to 70 wt. % of total weight of the rubber based component.

23. A tyre for a vehicle comprising:
a metal component, a textile component and a cured rubber based component, the components being bonded together by means of curing;
the cured rubber based component comprising lignin that has been treated by hydrothermal carbonization;
wherein the rubber based component that contains lignin that has been treated by hydrothermal carbonization is a non-tread area component of the tyre.

* * * * *